(12) United States Patent
Pesci-Anderson et al.

(10) Patent No.: US 8,914,299 B2
(45) Date of Patent: Dec. 16, 2014

(54) SYSTEM AND METHOD FOR COMPLIANCE AND OPERATIONS MANAGEMENT

(75) Inventors: Jennifer Pesci-Anderson, Windsor Locks, CT (US); Marcia Carignan, West Simsbury, CT (US); Leslie Hummer Lahue, West Simsbury, CT (US); Michael B. McCauley, West Hartford, CT (US); Kathryn Ann Stelter, Osceola, WI (US); Linda T. Telychka, Southington, CT (US); William R. Vollmar, Farmington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 236 days.

(21) Appl. No.: 13/272,871

(22) Filed: Oct. 13, 2011

(65) Prior Publication Data
US 2013/0096955 A1    Apr. 18, 2013

(51) Int. Cl.
G06Q 40/00    (2012.01)
G06Q 40/08    (2012.01)
G06Q 10/10    (2012.01)

(52) U.S. Cl.
CPC .............. *G06Q 40/08* (2013.01); *G06Q 10/10* (2013.01)
USPC ............................................... 705/4; 705/35

(58) Field of Classification Search
CPC ............................... G06Q 40/00; G06Q 40/08
USPC .................................................... 705/4, 35
See application file for complete search history.

(56) References Cited

U.S. PATENT DOCUMENTS

| | | | |
|---|---|---|---|
| 5,907,828 A * | 5/1999 | Meyer et al. ...................... 705/4 |
| 6,122,622 A | 9/2000 | Wiitala et al. |
| 6,688,475 B2 | 2/2004 | Petrancosta |
| 6,912,502 B1 * | 6/2005 | Buddle et al. ................ 705/7.41 |
| 7,386,505 B1 * | 6/2008 | Roth ............................... 705/38 |
| 7,412,417 B1 | 8/2008 | Tuttle |
| 7,979,333 B2 * | 7/2011 | Levering et al. ................ 705/35 |
| 8,028,269 B2 | 9/2011 | Bhatia et al. |
| 8,032,400 B2 * | 10/2011 | Gulko et al. ...................... 705/4 |
| 8,069,063 B2 * | 11/2011 | Strnad et al. ...................... 705/4 |
| 2003/0120528 A1 * | 6/2003 | Kruk et al. ......................... 705/7 |
| 2003/0171959 A1 * | 9/2003 | Galloway .......................... 705/4 |
| 2003/0217036 A1 | 11/2003 | Haunschild et al. |
| 2004/0098356 A1 | 5/2004 | Shabtai |
| 2005/0177599 A1 | 8/2005 | Goodman |

(Continued)

OTHER PUBLICATIONS

Compliance monitoring: Part III. (1995). The Disclosure, 12(8), 5. Retrieved May 16, 2014.*

*Primary Examiner* — Kito R Robinson
(74) *Attorney, Agent, or Firm* — Volpe and Koenig, P.C.

(57) ABSTRACT

A system and method for identifying at least one legal authority related to the insurance industry and tracking responsive procedures. The system and method include a processor configured to identify and evaluate at least one insurance related legal authority, a memory device configured to store information in a central record that includes entries indicating information about the at least one insurance related legal authority and the evaluated impact on the at least one insurance business area and modified procedures of at least one insurance business area that comply with the at least one insurance related legal authority based on the evaluated impact, a display device configured to display communications regarding the modifications to the at least one insurance business area, and a communications interface to record and communicate the modifications to the at least one insurance business area.

34 Claims, 31 Drawing Sheets

(56) References Cited

U.S. PATENT DOCUMENTS

| | | |
|---|---|---|
| 2005/0209892 A1* | 9/2005 | Miller .............................. 705/4 |
| 2005/0288994 A1 | 12/2005 | Haunschild |
| 2006/0101027 A1 | 5/2006 | Hotchkiss |
| 2008/0015913 A1 | 1/2008 | Courtney et al. |
| 2008/0133133 A1 | 6/2008 | Abels |
| 2009/0119141 A1* | 5/2009 | McCalmont et al. ............. 705/7 |
| 2009/0292632 A1 | 11/2009 | Dheer et al. |
| 2010/0023353 A1* | 1/2010 | Stoffiere .......................... 705/4 |
| 2011/0112974 A1 | 5/2011 | Hinton et al. |
| 2011/0258141 A1 | 10/2011 | Levering et al. |

* cited by examiner

Ops Compliance Training Detail: New Record

Save  Apply  View  Delete                                    Print

| | | |
|---|---|---|
| 1510 — Type Training Required: | Online | Edit  ⓘ Areas Impacted for Training: Senior Management |
| 1520 — Training Target Date: | 6/20/2011 | Training Completion Date: |
| 1530 — ⓘ Training Resources Assigned: | Monfils, Michele M. Vecchiarelli, Kathy | |
| 1540 — Training Availability Date: | 6/20/2011 | ⓘ Training Communication Target Date: 6/16/2011 |
| 1550 — Training Dependencies: | changes need to be made in the production environment; sametime meeting needs to be scheduled | |

▼ Training Material Attachments                                         | Add New |

| Name | Size | Type | Upload Date ▼ |
|---|---|---|---|

No attachments specified.

1590 — ⓘ Intranet Information:  http:// ▶

Alias: Sametime Meeting http://wss3/domain/collaboration/default.aspx

Apply

1500

1560 (pointing to Areas Impacted for Training)
1570 (pointing to Training Completion Date)
1580 (pointing to Training Communication Target Date)

| Ops Compliance Training Detail: New Record | | ? ☒ |
|---|---|---|
| Save Apply View Delete | | Print |

| Type Training Required: | E-Mail ▽ | Edit |
| Training Target Date: | 6/17/2011 🗓 | |
| ⑦ Training Resources Assigned: | Monfils, Michele M. | ⋯ |
| Training Availability Date: | 6/17/2011 🗓 | |
| Training Dependencies: | preparation of training materials | |

| ⑦ Areas Impacted for Training: | Senior Management | Edit |
| Training Completion Date: | 🗓 | ⋯ |
| ⑦ Training Communication Target Date: | 🗓 | |

▼ Training Material Attachments

| Name | Size | Type | Upload Date ▼ | Add New |
|---|---|---|---|---|
| 📄 Operations Compliance Archer Application - June 2011 Enhancements[1].ppt | 947KB | Powerpoint Presentation | 6/16/2011 1:19 PM | 🗑 |

⑦ Intranet Information: http:// ▶

Alias:

[ Apply ]

SYSTEM AND METHOD FOR COMPLIANCE AND OPERATIONS MANAGEMENT

FIELD OF INVENTION

The present invention is related to the field of compliance and operations management, and more particularly provides a system and method for compliance and operations management.

BACKGROUND

Insurance and investment companies have a broad reach. These companies provide a myriad of products including life insurance, group and employee benefits, automobile and homeowners insurance, and business insurance, as well as investment products, annuities, mutual funds and college savings plans. Some insurance companies maintain offices across the United States, Japan, United Kingdom, Canada, Brazil, and Ireland, for example. These companies serve millions of customers throughout the world, and the customers include individuals, institutions, and businesses. The service of these customers may be through independent agents and brokers, financial institutions, and online mechanisms.

As a result of doing business and providing services and products in a myriad of locations, insurance companies may be subject to extensive regulations and constant changes in legislation. Specifically, insurance companies may be subject to complex laws and regulations that are administered and enforced by a number of governmental authorities, including state insurance regulators, the Security and Exchange Commission (SEC), National Association of Insurance Commissioners (NAIC), the U.S. Department of Justice, state attorneys general, and the Internal Revenue Service (IRS), as well as governmental authorities in other countries such as the Ministry of Finance (MOF) in Japan and the Financial Services Authority (FSA) in the United Kingdom, for example. Each of these authorities interprets legal and regulatory issues in their own way. So in addition to changes in the overall legal or regulatory environment, particular authorities' interpretations of issues change the landscape and require insurance companies to change their views regarding the actions needed from a legal and/or regulatory risk management perspective possibly necessitating changes to practices and procedures.

Insurance companies are regulated and supervised to protect the insurance policyholders. This regulation and supervision may vary from location to location and from political climate to political climate, but generally is governed by state statutes in the United States and by the FSA in the United Kingdom and the MOF in Japan. These regulations may establish standards related to the setting of premium rates, minimum capital requirements and solvency margins, restrictions on the nature, quality and concentration of investments, restrictions on the types of terms and conditions that may be included in the insurance policies, limitations on the amount of dividends that may be paid and/or foreign profits that can be repatriated, required methods of accounting, reserves for unearned premiums, losses and other purposes, administrative practice requirements, assignment of residual market business and potential assessments for the provisions of funds necessary for the settlement of covered claims, and impositions of fines and other sanctions. State insurance regulators and the NAIC regularly re-examine existing laws and regulations applicable to a company and its products. Changes in these laws and regulations, or in the interpretations of the laws and regulations, may affect the operations of insurance companies.

Generally, the U.S. federal government does not directly regulate the business of insurance. However, federal legislation and administrative policies can significantly affect insurance companies. The legislation and policies may include financial services reform legislation, securities regulation, pension regulation, privacy, tort reform legislation and taxation. In addition, there are various forms of Federal oversight and possible regulation of insurance that had been discussed and/or implemented at the federal level including the Wall Street Reform and Consumer Protection Act, which establishes the Federal Insurance Office within the Department of Treasury to monitor the insurance industry, identify gaps in regulation of insurance, provide a Federal charter for insurers, and identify insurers that should be subject to stricter standards. Additionally, the federal government has enacted major health reform legislation that changes the landscape of the U.S. health care insurance marketplace including individual and employer mandates, health insurance exchanges, coverage and its inclusion, medical loss ratios, government reimbursements and subsidies, as well as altering the federal and state regulation of health insurers.

Compliance with the laws and regulations can be time-consuming and personnel intensive, and changes in the laws and regulations, as well as the interpretations of the laws and regulations by the governing bodies, increases the compliance conundrum. Thus far, companies use multiple databases and spreadsheets created by many individuals to track issues resulting from legislation and regulations, audits, and the like. Generally, there has been no central repository and no means of meaningful reporting. In total, compliance, and legislative and regulatory monitoring is inefficient and time-consuming.

Thus, there exists a need for a system and method that simplify a complex manual process of monitoring and complying with regulations and changes in legislation to gain efficiencies and identify impacts to insurance companies and track the end-to-end process in support of these impacts across the lines of business of the insurance company while maintaining data integrity and eliminating key-person dependencies.

SUMMARY

A system for identifying at least one legal authority related to the insurance industry and tracking procedures responsive to the identified at least one legal authority while monitoring compliance with changed procedures is disclosed. The system includes a processor configured to identify and evaluate at least one insurance related legal authority that relates to at least one insurance business area. The system includes a memory device configured to store information in a central record that includes entries indicating information about the at least one insurance related legal authority and the evaluated impact on the at least one insurance business area by the at least one insurance related legal authority and modified procedures of at least one insurance business area that comply with the at least one insurance related legal authority based on the evaluated impact. The system includes a display device configured to display communications regarding the modifications to the at least one insurance business area. The system includes a communications interface to record and communicate the modifications to the at least one insurance business area. The modifications to the at least one business area are tracked and monitored for compliance with the changed procedures.

A method of complying with at least one legal authority related to the insurance industry and assuring compliance with the at least one insurance related legal authority is disclosed. The method includes initiating a central record in a database based on a processor identified at least one insurance related legal authority, the record associated with the at least one insurance related legal authority, evaluating the impact on at least one insurance business area by the at least one insurance related legal authority and storing the impact in the record stored on a memory device, implementing modifications to the procedures of the at least one insurance business area to comply with the at least one insurance related legal authority based on the evaluated impact and storing the modifications on a memory device, communicating the modifications to the at least one insurance business area using a communications interface, and monitoring and tracking the modified procedures of the at least one insurance business area to comply with the at least one insurance related legal authority.

A computer readable medium including hardware design code stored thereon is disclosed. The computer readable medium including hardware design code stored thereon which when executed by a processor cause the system to comply with at least one legal authority related to the insurance industry and monitor and track compliance with the at least one insurance related legal authority, the method including initiating a central record in a database based on a processor identified at least one insurance related legal authority, the record associated with the at least one insurance related legal authority, evaluating the impact on at least one insurance business area by the at least one insurance related legal authority and storing the impact in the record stored on a memory device, implementing modifications to the procedures of the at least one insurance business area to comply with the at least one insurance related legal authority based on the evaluated impact and storing the modifications on a memory device, communicating the modifications to the at least one insurance business area using a communications interface, and monitoring and tracking the modified procedures of the at least one insurance business area to comply with the at least one insurance related legal authority.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts:

FIG. 9 illustrates a screen shot that represents a portion of the screen associated with the screen shot of FIG. 11;

FIG. 10 illustrates a screen shot of the system that may be used in the communicating step of a compliance management system and method;

FIG. 11 illustrates a screen shot demonstrating the actions of the system when the required training of the screen shot is toggled to "yes;"

FIG. 12 illustrates a screen shot depicting the training detail sub-window allowing input of new information;

FIG. 13 illustrates a screen shot depicting a completed training detail sub-window;

FIG. 14 illustrates a screen shot depicting a completed email training sub-window;

FIG. 15 illustrates a screen shot depicting multiple completed training sub-windows;

FIG. 19 illustrates a work initiation tab in the exemplary wealth management system;

FIG. 20 illustrates an evaluation tab exemplary wealth management system that enables additional detail in evaluating the scope, understanding the associated inherent risk and identifying monitoring requirements;

FIG. 21 illustrates a portion of the evaluation tab;

FIG. 22 illustrates a screen shot of a tab for decisions and discussions in the exemplary wealth management system;

FIG. 23 illustrates a screen shot of the implementation tab in the exemplary wealth management system;

FIG. 24 illustrates another screen shot with respect to the implementation tab;

FIG. 25 illustrates a screen shot that captures form changes in the implementation stage in the exemplary wealth management system;

FIG. 26 illustrates a screen shot of the implementation tab with respect to the North Carolina example;

FIG. 27 illustrates a screen shot of the communications planning in the exemplary wealth management system;

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in insurance, legislative, operations, and compliance management systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

A system and method for identifying at least one legal authority related to the insurance industry and tracking procedures responsive to the identified at least one legal authority while monitoring compliance with changed procedures is disclosed. The system and method includes a processor configured to identify and evaluate at least one insurance related legal authority that relates to at least one insurance business area. The system and method includes a memory device configured to store information in a central record that includes entries indicating information about the at least one insurance related legal authority and the evaluated impact on the at least one insurance business area by the at least one insurance related legal authority and modified procedures of at least one insurance business area that comply with the at least one insurance related legal authority based on the evaluated impact. The system and method includes a display device configured to display communications regarding the modifications to the at least one insurance business area. The system and method includes a communications interface to record and communicate the modifications to the at least one insurance business area. The modifications to the at least one business area are tracked and monitored for compliance with the changed procedures.

Figure 1:
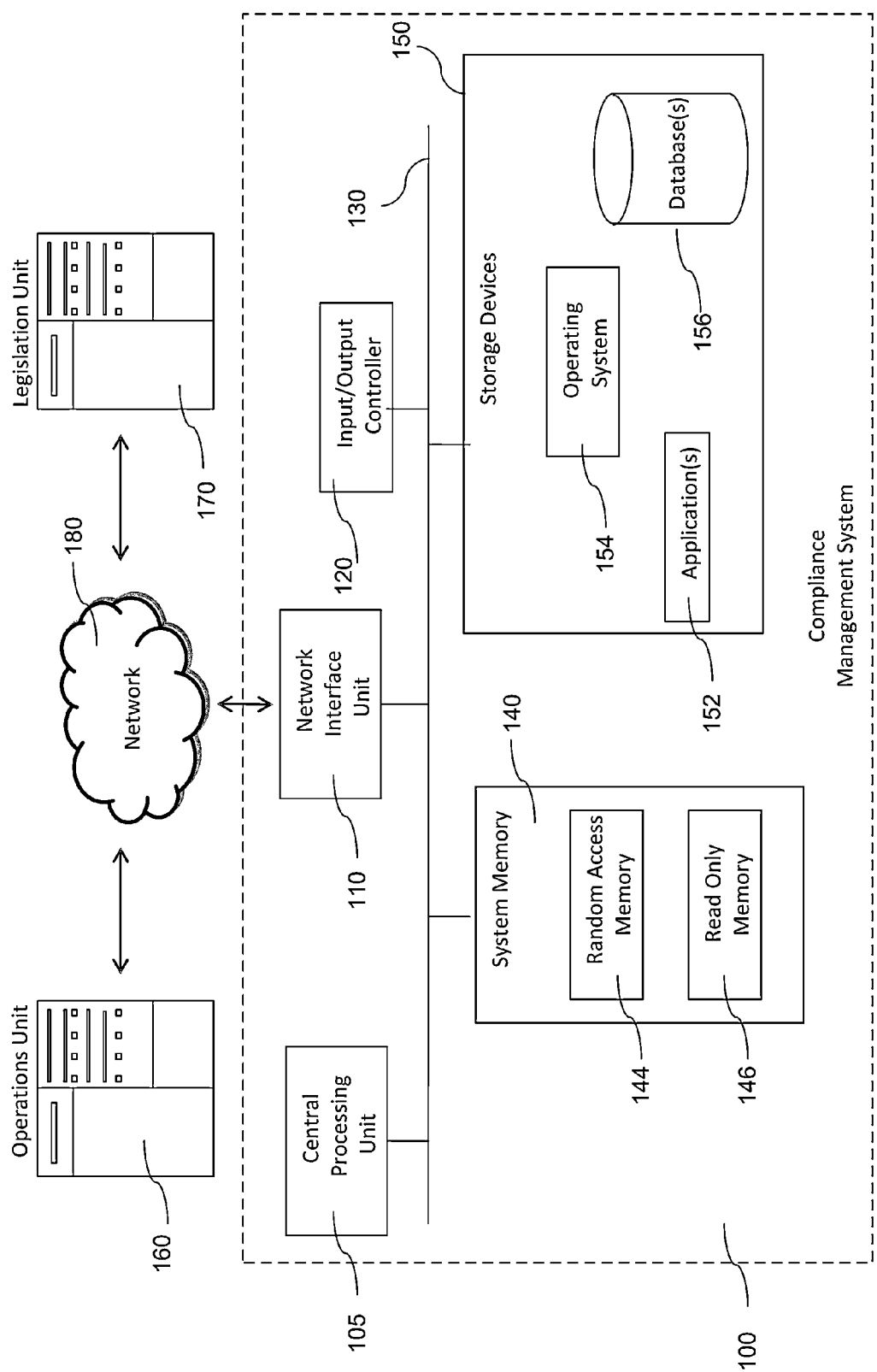
FIG. 1 illustrates a compliance management system.

FIG. 1 illustrates a compliance management system 100. Compliance management system 100 may be coupled to operations unit 160 and legislation unit 170 through network 180. Compliance management system 100 may monitor operations via operations unit 160 state processing and controls and may save operations documents within storage devices 150. Compliance management system 100 may monitor legal authority via legislation unit 170 for changes that affect system 100 or business units presided upon by system 100 and/or for changes or potential changes that may be watched or more closely monitored. Legal authority may include legislation, regulation, court holdings and decisions, and rulings for/against companies and fines incidents. Legislation may include U.S. state and federal legislation, and foreign legislation including legislation from the United Kingdom and Japan, while regulation may include agency regulation in both the U.S. and abroad. Court holdings and decisions may include any application and interpretation of legislation and regulation such as through courts and administrative agencies in both the U.S. and abroad. Rulings for/against companies and fines incidents incorporate all other decisions and holdings by agencies and governing bodies that provide guidance under which companies may operate that are not captured in legislation, regulation and/or court holdings and decisions. Rulings for/against companies may include types of binding and non-binding jurisprudence.

System 100 includes one or more central processing units (CPU) 105, a network interface unit 110, an input/output controller 120, system memory 140, and one or more storage devices 150. Each CPU 105, network interface unit 110, input/output controller 120, system memory 140, and storage devices 150 are communicatively coupled via bus 130. System memory 140 may include random access memory (RAM) 144, read only memory (ROM) 146, and one or more caches. Storage devices 150 may include one or more applications 152, an operating system 154, and one or more databases 156. Storage devices 150 may take the form of, but are not limited to, a diskette, hard drive, CD-ROM, thumb drive, hard file, or a Redundant Array of Independent Disks (RAID). System 100 may be accessed via network 180 using a mainframe, thin client, personal computer, mobile device, pad computer, or the like and information processed by CPU 105 and/or operated upon or stored on storage devices 150 and/or in memory 140 may be displayed to a user through a user device (not shown).

System 100 may operate using cloud computing. That is, system 100 may provide computation, software, data access, and storage services that are not based on physical location and configuration of the system and/or knowledge thereof. System 100 may be provided over the internet, and may be accessed from a web browser, for example. The data and software for the application may be run and sorted on servers at a remote location. Screen-sharing technology and/or thin-client technology may also be used to deliver data and software while the computing resources may be consolidated at a remote data center.

Operationally, system 100 monitors legal authority with legislation unit 170. Upon identifying legal authority relevant to system 100 and/or the business units over which system 100 presides, system 100 may create a record to track this legal authority, the resulting impact on the business units, necessary changes in policies and procedures of the business units, and monitors the business units modified policies to insure compliance with the tracked legal authority. A policy may be a statement or statements on how a company implements a standard or program, such as a privacy policy, for example. A procedure may be directives that flow from the overarching policy that provide more detailed directions and guidelines for implementing the broader defined policy.

Specifically, a record is created either by interfacing with system 100 or automatically by system 100. This record may be stored on storage devices 150 and may take the form of a database or data in a database, such as database 156. This record may include identifying information about the legal authority, such as that title of the legal authority, a summary of the legal authority, a location or locale that will be covered by legal authority, and the date at status of the legal authority. Additionally, the record may contain a copy of the legal authority attached in a document, such as a word document, a spreadsheet, or the like. In addition, one or more tasks may be created to provide a roadmap for or identify future processing of the legal authority and system 100.

Once a record is created and the legal authority is included in the record, system 100 may evaluate the impact of the legal authority and provide changes or modifications in policies and procedures of the affected business units to enable compliance with the legal authority. This evaluation may be performed by interfacing with system 100 or automatically by system 100. This evaluation may include an analysis of the legal authority and a study of the policies and procedures of the impacted business units. A gap analysis may be performed. This evaluation may provide the risk associated with the new legal authority and the impacted business units policies and procedures.

Once the risk of the new legal authority has been identified, a plan for handling the new legal authority and mitigating the risk associated therewith may be established. This plan may include modifying, altering, reading, or removing policies and procedures of the affected business units. The plan may account for the risk level associated with the legal authority and the scope of the legal authority and locale governed by the legal authority. This plan may account for business units and the specific products within those business units that are affected by the legal authority. The plan may identify business processes to be changed and identify if the change is a modification or creation of new processes. In addition, system 100 may provide documentation evidencing the change required and/or documentation underlying the reason for the change.

System 100 may identify methods of communicating the changes in policies and processes identified in the plan. Communication may take the form external communications, such as administrative bulletins, marketing bulletins, broker mailings, and client mailings, and/or may involve training. System 100, associated with the established record, may provide a mechanism to attach to the record both internal and external communication documents.

System 100 may provide methods for monitoring and fulfilling the established plan. This may include monitoring operations and its associated processes and policies and comparing these processes and policies to those established in the plan. This monitoring may be performed using the record of system 100 and may be performed by interfacing with system 100 or automatically by system 100.

For example, system 100 may uncover legal authority relating to the underwriting of insurance premiums in Connecticut. System 100 may create a record stored in database 156 to monitor, track, and comply with the changes to the underwriting requirements for Connecticut. This record may be evaluated against the insurance company's current business policies in underwriting insurance premiums in Connecticut. A risk of legal authority may be identified with respect to the underwriting of insurance premiums and the policies and procedures of the business units within the company. Once this risk is identified, a plan may be established in order to insure compliance with the underwriting requirements for Connecticut. This plan may be implemented using the record of system 100. New policies and procedures may be established to ensure compliance. These policies and procedures may be communicated to the business units affected by the change in underwriting requirements for Connecticut using system 100. Training, bulletins, and modified form documents may be provided to the business units. System 100 may monitor the implemented changes within the business unit to ensure ongoing compliance with the new underwriting requirements for Connecticut.

In this way system 100 operates to provide a system and method that simplifies a complex manual process of monitoring and complying with legal authority to gain efficiencies and identify impacts to insurance companies and track the end to end process in support of these impacts across the lines of business of the insurance company while maintaining data integrity and eliminating key-person dependencies.

Figure 2:
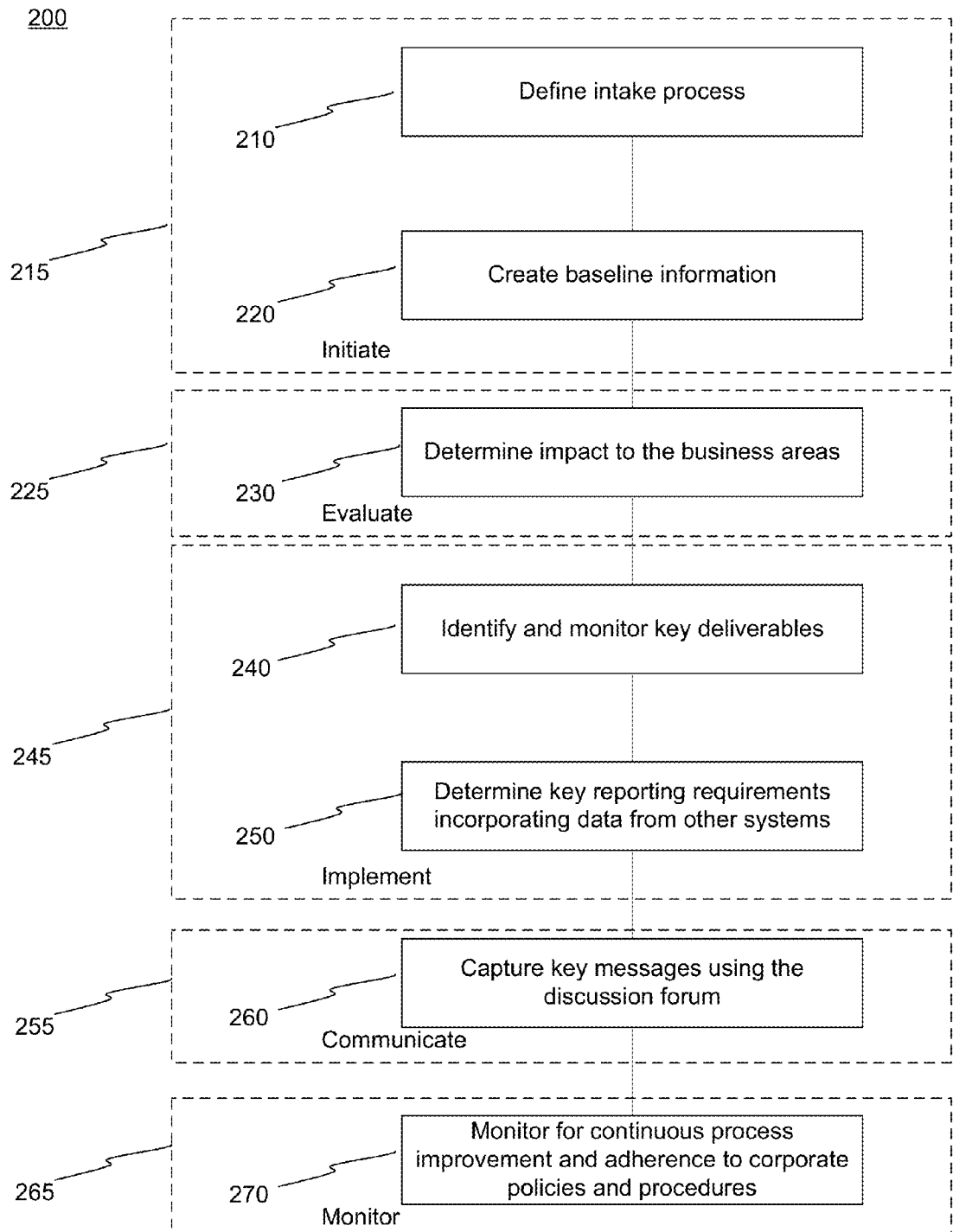
FIG. 2 illustrates a method of performing compliance management.

FIG. 2 illustrates a method 200 of performing compliance management. Method 200 includes the high level steps of initiating compliance management at step 215, evaluating legal authority at step 225, implementing compliant practices and solutions at step 245, communicating changes to practices and solutions at step 255, and monitoring for improvement and adherence to policies and procedures at step 265. Method 100 assures compliance with at least one legal authority related to the insurance industry. Specifically, method 100 includes initiating 215 a central record associated with the at least one insurance related legal authority in a database, evaluating 225 the impact on at least one insurance business area by the at least one insurance related legal authority and indicating the impact in the record, implementing 245 modifications to the procedures of the at least one insurance business area to comply with the at least one insurance related legal authority based on the evaluated impact, communicating 255 the modifications to the at least one insurance business area, and monitoring 265 the procedures and practices of the at least one insurance business area to assure compliance and adherence to the communicated modifications and to comply with the at least one insurance related legal authority.

The high level step of initiating compliance management at step 215 may include the more detailed steps of defining the intake process at step 210 and creating baseline information at step 220. Initiating 215 includes creating a record within system 100. This record may include inputting information identified in an environmental scan, including uncovered legal authority. The output of the initiating step is a record that identifies legal authority to be complied with and may include business units that may be impacted by the legal authority in question. This record may be stored within database 156. In addition, initiating 215 includes collecting and recording source material. This source material may include the underlying legal authority, including the legislation or regulation, documentation associated with the legislation or regulation, such a legislative history or regulatory notices, for example, law reviews and opinions, documentation provided by insurance groups or entities, by way of non-limiting example only. In order to collect and record this material, a determination must be made and the intake process defined at step 210. For example, it must be determined if received information is in fact legislation, regulation and/or other type of legal authority. Information may be received from different sources such as Lexus/Nexus, information from the American Council of Life Insurers (ACLI), the regulations directly, and NILS INsource, which is a web-based insurance regulatory content provider. This information may be received via a subscription service or by accessing free information. Once this information is received, baseline information is created at step 220. This baseline may include information, such as the name of the new legal authority and the elements contained therein, as well as information related to the community's interpretation of the new legal authority. In essence, initiating 215 is obtaining content and information that may affect the understanding of the legal authority and compliance of business practices, and starting a record for subsequent evaluation of the obtained content information.

The high level step of evaluating legal authority at step 225 includes the step of determining the impact to the business areas at step 230 of the initiated records based on the obtained content and information. Determining the impact at step 230 entertains the question of what the new legal authority means to the insurance company. This step may include determining the status of the legal authority identified and entered into the record during the initiation phase and filtering using database 156 the obtained information. Specifically, a gap analysis may be performed. A gap analysis is a tool that allows companies to compare actual performance with potential performance and identifies gaps between the demised allocation and integration of the imports and the current allocation level to reveal areas that can be improved. Analysis involves determining, documenting, and approving the variance between business requirements and current capabilities. In this situation, the gap analysis may be a formal study of how the business is currently operating, including the associated policies and procedures relevant to the legal authority, and where based on the underlying legal authority, the company and its policies needs to go in the future. In performing the analysis, there may be interactions with operations and the impacted business areas to understand the current state processing and controls, and may validate with other compliance areas, such as the legal department, for example. The analysis may include gathering supporting documentation and providing memorandum identifying a memo value, organizational impact, and areas impacted. Further, the analysis may score the risk based on impact of the new legal authority and the effort required to comply therewith. This score may be provided at an initial stage and then updated as more information is obtained and/or a full analysis is completed. This score may result from the use of a score calculator tool of system 100. The evaluation step 225 outputs impacted portions of the company subject to the legal authority in question and the risk associated with each impact. This information may be included in the record and used as an input in the step of implementation 245.

The high level implementing complaint practices and solutions at step 245 includes the more detailed identifying and monitoring key deliverables at step 240 and determining the reporting requirements incorporating data from other systems at step 250. Implementing 245 receives the record including the legal authority in question and the evaluated impact of the legal authority to identified business units. Implementing 245 includes working with business partners in the design and implementation of compliant solutions. These business partners may include impacted business units within the insurance company and/or other entities within or outside the insurance company that provide insight into the compliance arena. Implementing 245 includes educating impacted business areas on the details of these solutions and insuring the compliant policies, procedures and controls are documented. Implementing 245 includes identifying business information impacted. For example, a business area and product may be defined, and may be indicated if there is a business process change associated with that business area and/or product, and forms associated therewith may be attached in the record. Additionally, information technology information may be entered into the record, including tracker information, windows rights management (WRM) information, a description of the change, status, and work effort. Implementing 245 may also include deciding and entering certain project information into the record, such as the timeline for implementing compliant policies. Implementing 245 outputs key deliverables and changes to the business units' procedures for communicating to the business units and monitoring and tracking compliance therewith.

The high level communicating changes to practices and solutions at step 255 may include step 260 of capturing key messages using the discussion form. The level and method of communication is generally determined amongst the impacted business areas and compliance personnel. Considerations into the method of communication include the level of risk, visibility of the risk, and the like. Communications may include an operations compliance bulletin, compliance roundtable, general business communications, face-to-face communication, and on-line training documentation and implementation procedures. An operations compliance bulletin may be used when risk is rated a high impact and this bulletin, generally, captures all the necessary information to present the risk. The compliance roundtable involves risks that are high impact and a need to demonstrate with supporting evidence, such as an operations compliance bulletin, which may be attached to the record in system 100. General business communications may include Hartmonitor, IA status, and the like. Face-to-face communications may include classroom training and/or staff meetings with impacted business units. Training material and attendance tracking may be attached to the record in system 100.

External and internal communications may be tracked. These communications may be tracked in the record in system 100, such as by including the type of communication, the target and actual distribution date of the communication, and the attached communication documents. When training is involved, the type of training may be tracked including the areas impacted, the training schedule and other resource information, and the attached training material may be included in the record of system 100.

The high level step 265 of monitoring for improvement and adherence to policies and procedures may include monitoring for continuous process improvement adherence to corporate policies and procedures at step 270. Monitoring 265 receives the modified procedures previously defined in the record and maintains a history and properties of the changed procedures. This may include monitoring affected business units within the insurance company to assure compliance with the legal authority, maintaining the status of the work record, and tracking the communications and the necessary approvals and dates accordingly. The output of the monitoring 265 includes notification and tracking relevant to the modified procedures associated with the legal authority in question. This monitoring further enables the ability to track gaps and provide remediation with respect to the legal authority in question.

In addition, method 200 may also include discussing and deciding with affected and impacted business units, external teams, and other internal units within the insurance company. These discussions may be on-going and may occur at each step in the process. Throughout the process, soliciting and documenting discussions and decisions may occur. These discussions and decisions may be documented both carefully and appropriately within the record of system 100. For example, the person making the decision, the date of the decision, the business unit or area that made the decision, comments related to the decision, and any documents relating to decision may be input into the record of system 100.

Figure 3:
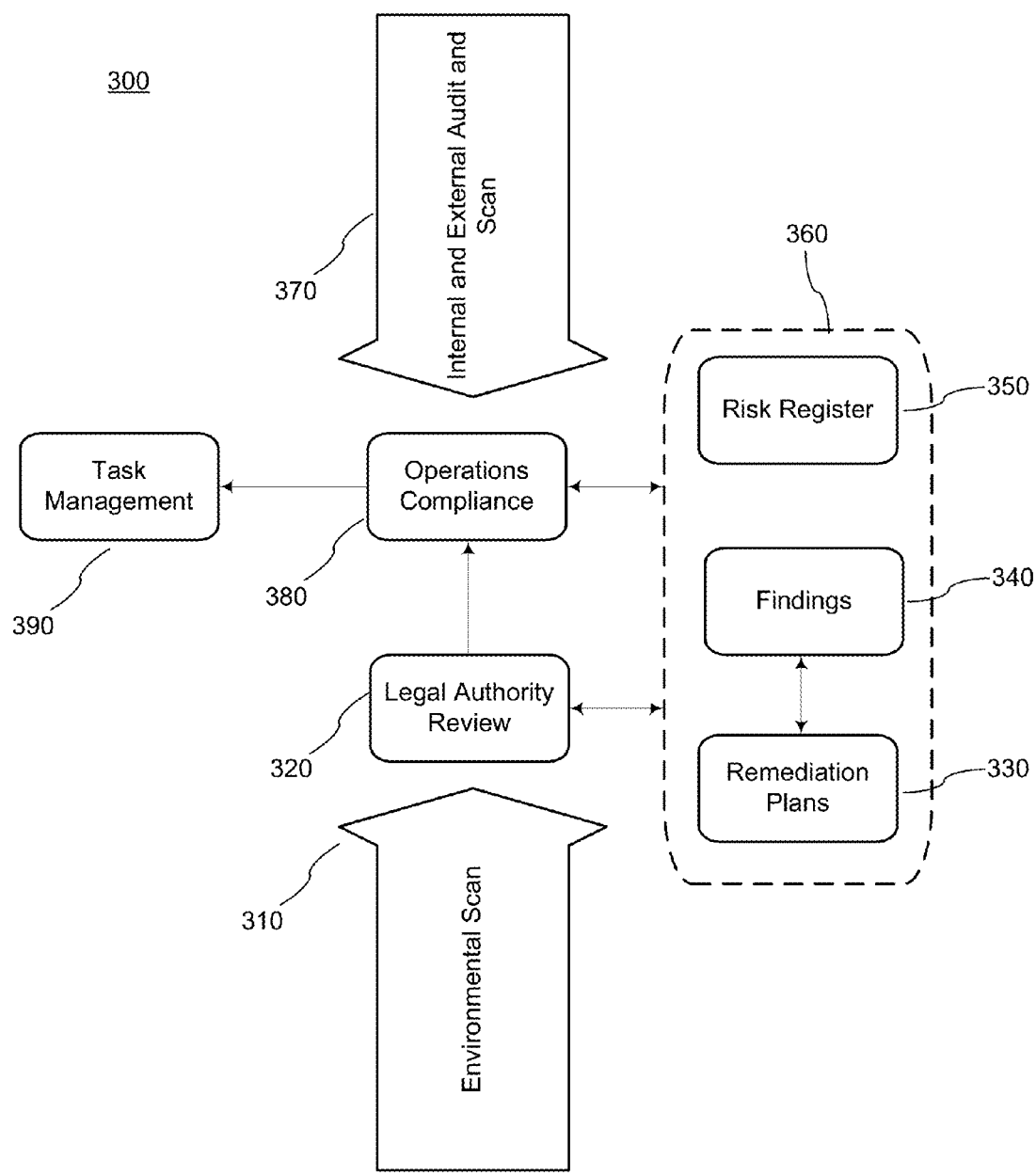
FIG. 3 illustrates a flow diagram for the system of FIG. 1 and the method of FIG. 2.

FIG. 3 illustrates a flow diagram for system 100 of FIG. 1 and method 200 of FIG. 2. As may be seen in FIG. 3, the data flow 300 demonstrates incoming data that is collected, analyzed, coalesced, and acted upon and culminates at task management 390. Data flow 300 includes an environmental scan 310. This scan 310 finds and captures data as inputs into flow 300. The data captured in scan 310 is passed to a legal authority review 320. This review, as described above, processes the incoming data, such as by performing a gap analysis or the like, and determines the breadth and scope of the captured legislation and/or regulation. This analyzed information is provided to both operations compliance 380 and a processor 360. This data flow provides operation compliance 380 with the analyzed data so that operation compliance 380 may provide information and an assessment, such as from the business unit perspective, to processer 360. Within processer 360 there is a risk register 350, findings 340, and remediation plans 330. Each of these repositories acting alone or in unison, or any combination, intakes the analysis from legal authority 320 and any information and assessment from operation compliance 380 to determine the risk associated with the new legislation, any other findings that need to accompany the flow of this legal authority in system 100, and provides remediation plans for amending or modifying policies of the company, and the underlying business units to comply with the new legal authority. The risk 350, findings 340 and plans 330 may be fed back to the legal authority review 320 for further study in comparison to the legal authority and also may be fed to the operations compliance 380 for implementation of the policies and procedures. These policies and procedures are finalized and provided to task management 390 for implementation. Task management 390 may serve as the overseer of the compliance process, such as a handler, for example. Task management 390 may include the steps to complete a given step or all steps providing compliance. Task management 390 may provide notifications and tracking. This implementation may be monitored by operations compliance 380.

Figure 4:
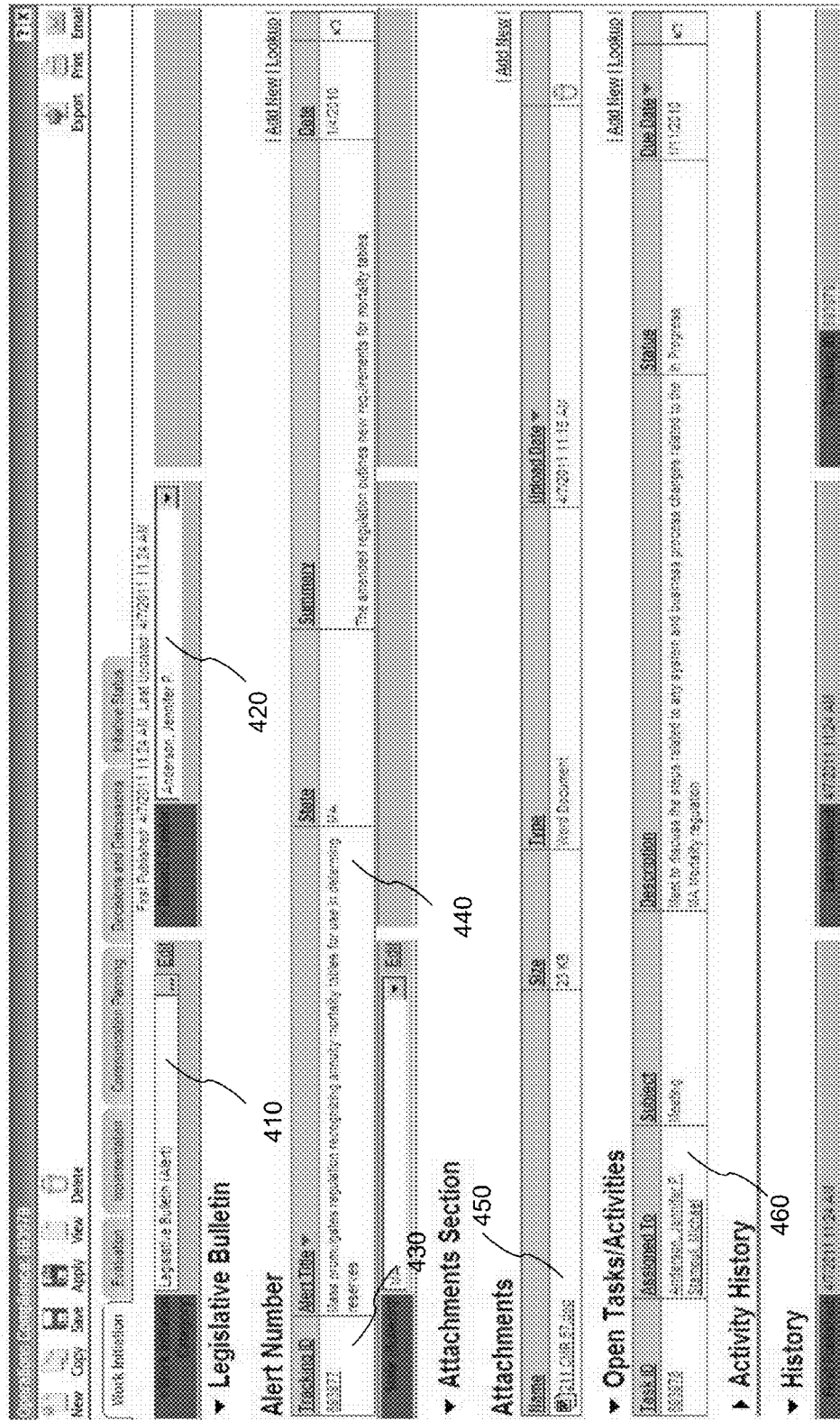
FIG. 4 illustrates a screen shot of the system for the initiation step of a compliance management system and method.

FIG. 4 illustrates a screen shot 400 of the system 100 for the initiation of step 215. Screen shot 400 depicts an incoming legislative bulletin 410, one type of legal authority that has been entered into system 100 by a record creator 420. System 100 assigns a tracking identifier 430 to the record as shown in screen shot 400. A tile, summary and date 440 are accorded the new record. Any associated documentation 450 may be included in the record. Tasks 460 may be created to process the new record. As shown in shot 400, task 460 may include a meeting to discuss the step related to any system and business process change related to the Massachusetts Mortality Regulation as defined in the legislative bulletin.

Figure 5:
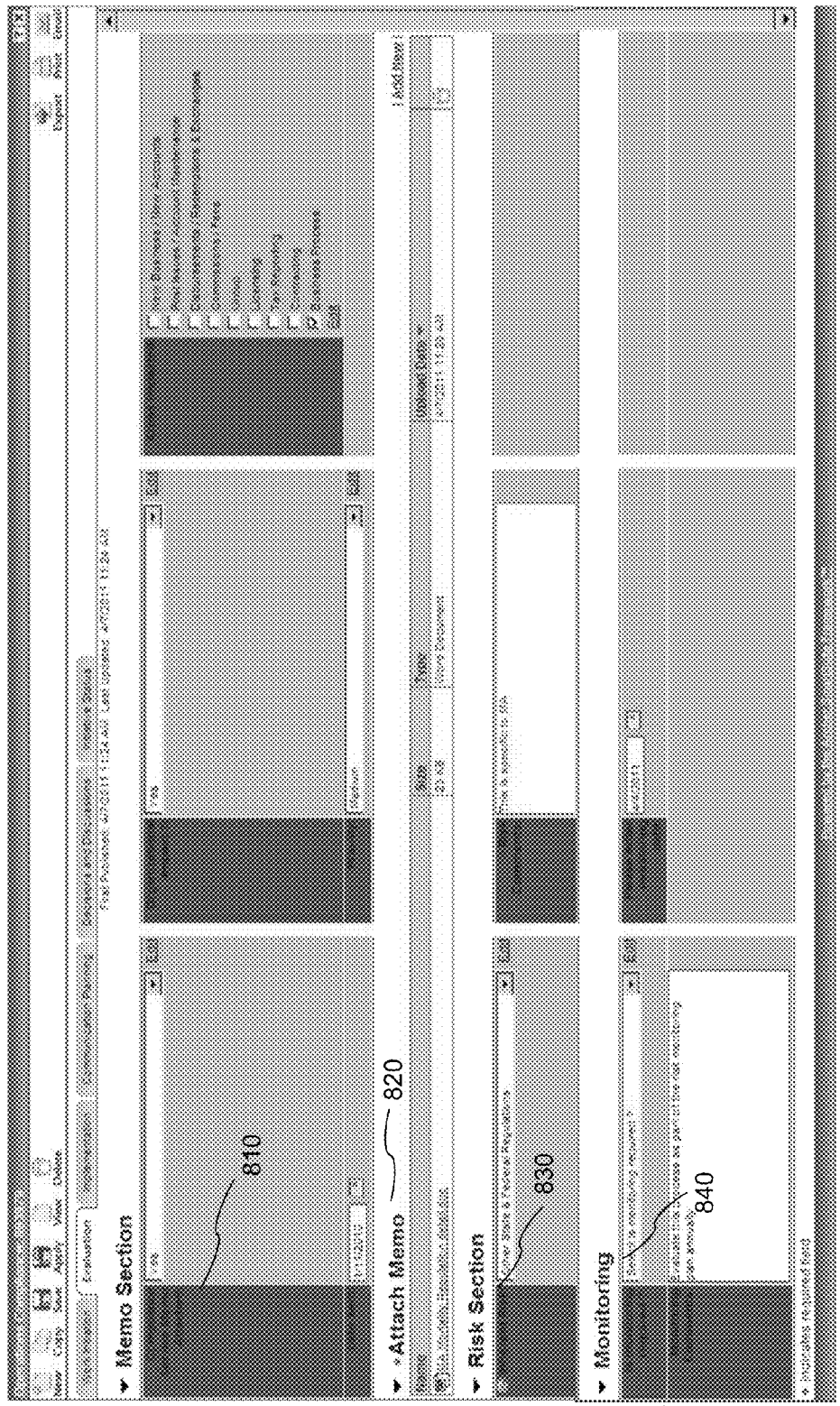
FIG. 5 illustrates a screen shot of the system for the evaluation step of a compliance management system and method.

FIG. 5 illustrates a screen shot 800 of the system 100 for the initiation of step 215. Screen shot 800 depicts the evaluation step 225 with a memo section 810, an attachment section 820, a risk section 830, and a monitoring section 840. Memo section 810 includes drop down menus to provide information such as if a compliance service memorandum is attached, if there is any organizational impact and the priority, as well as identifying areas that are impacted. Attach memorandum section 820 allows for the upload of a data file or files providing further detail regarding the legal authority associated with the record, in this depiction, the Massachusetts Mortality Regulation. Risk section 830 depicts drop down menus for the inherent risk with other legal authority and allows a user to provide comments in support of the inherent risk. Monitoring section 840 illustrates a series of drop down menus that enable input of monitoring information including assigning future monitoring and an associated date and comments regarding the monitoring.

Figure 6:
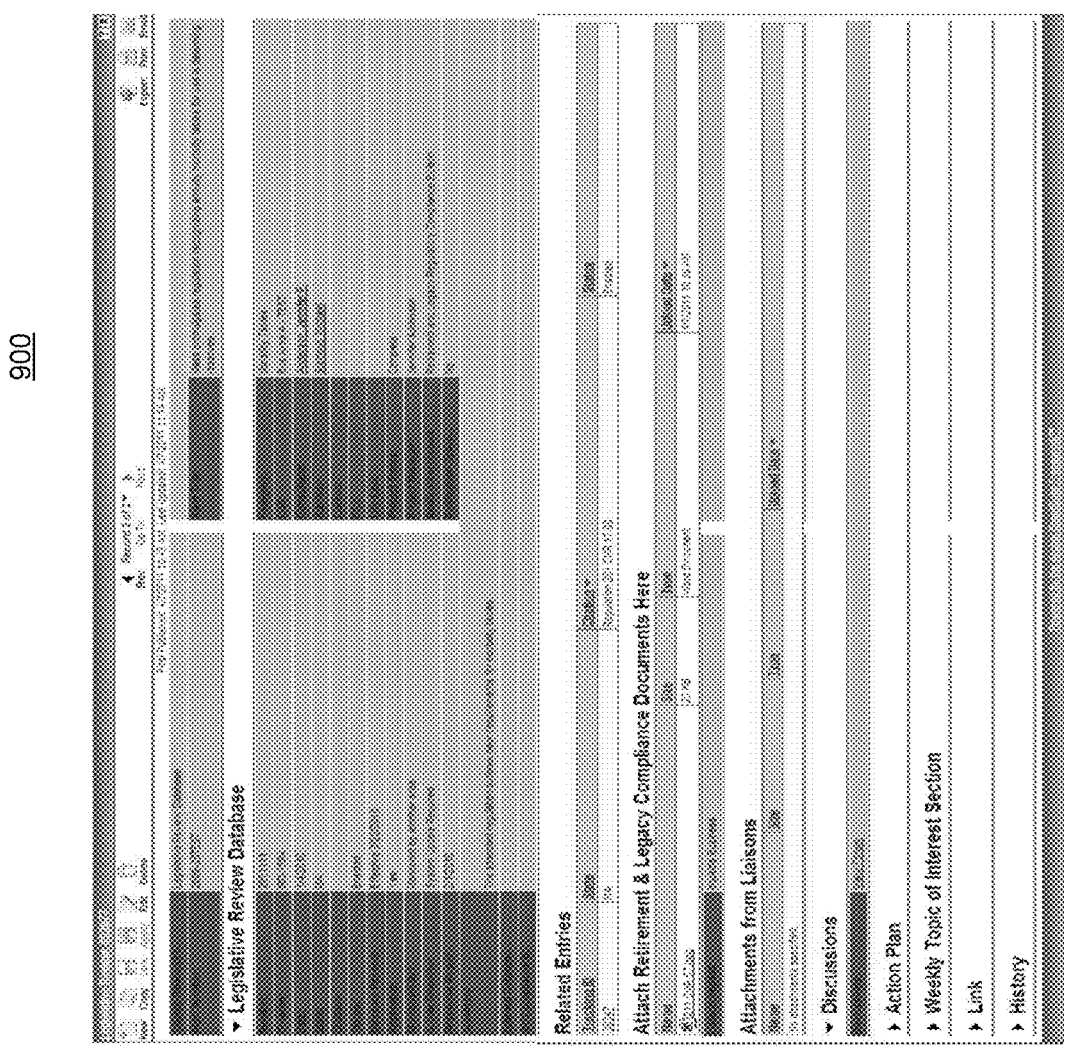
FIG. 6 illustrates a screen shot of the system that may be used in the evaluation step of a compliance management system and method.

FIG. 6 illustrates a screen shot 900 of the system 100 that may be used in the initiation step 215. Screen shot 900 depicts a legislative review database of system 100 that tracks and organizes input information. This provides tracking of the evaluation phase of method 200. Source fields within screen 900 may be used to distinguish different categories of data and notification may be used to complete the evaluation. Screen 900 provides a mechanism to input related entries and attach retirement and legacy compliance documents and generally provides a depiction of the state of system 100 with respect to the current record.

Figure 7:
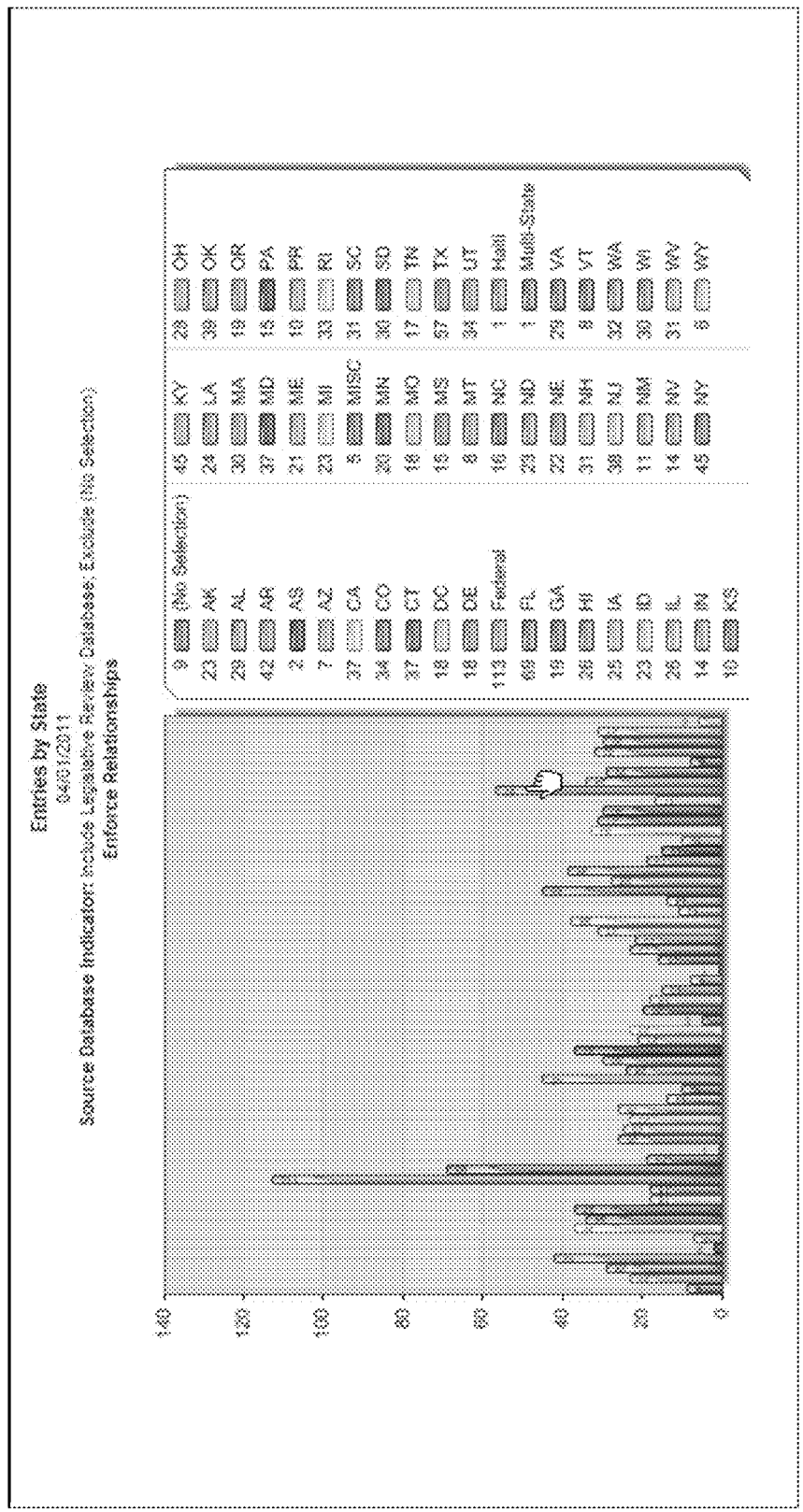
FIG. 7 illustrates a screen shot identifying entries by state.

FIG. 7 illustrates a screen shot 1000 identifying entries by state. Screen shot 1000 provides a graphical representation of data within system 100 depicting the relationships on a state-by-state basis as well as at the federal level.

Figure 8:
FIG. 8 illustrates a screen shot of the system that may be used in the implementation step of a compliance management system and method.
Figure 9:
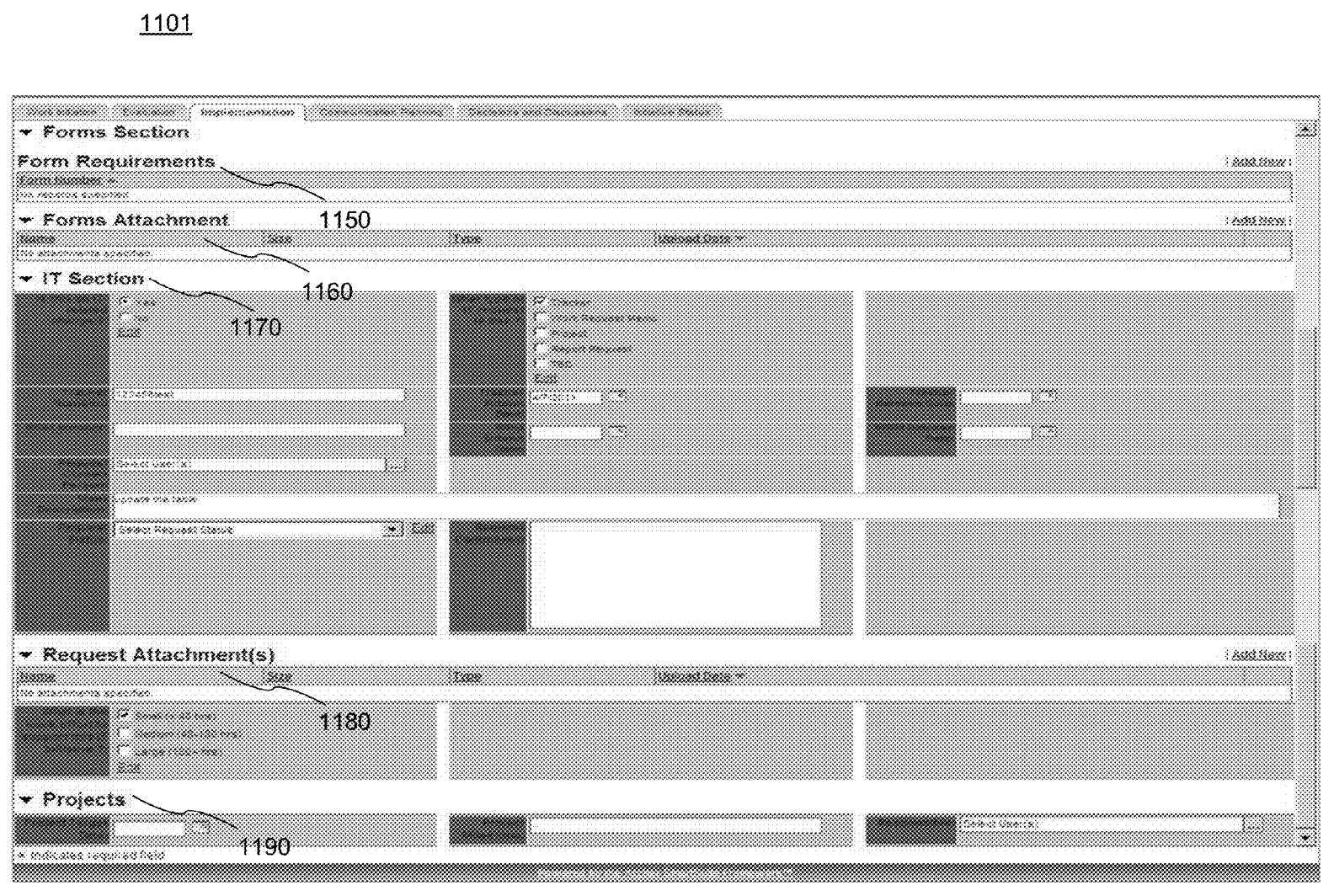

FIG. 8 illustrates a screen shot 1100 of the system 100 that may be used in the implementation step 245. FIG. 9 illustrates a screen shot 1101 that represents a portion of the screen associated with screen shot 1100. Referring to screen shots 1100 and 1101 in tandem showing product information 1110, which identifies business areas and products that may be impacted by the legal authority that is being evaluated. Screen shots 1100 and 1101 depict a dropdown menu that allows input of a business process section 1120 represents queries regarding business process change. A business process change section 1130 depicts dropdown menus for inputting the business processes to be changed and responding to a query regarding modification to existing process and if the process is a new process. A business process attachment section 1140 depicts dropdown menus identifying the reason that the change is necessary and the level of impact the change requires along with several comment sections for inputting reasons for change, evaluating comments, and business process change comments. A form requirements section 1150 depicts a section for inputting form requirements and form numbers. A forms attachments section 1160 depicts a section for attaching forms in the record. An IT section 1170 depicts information that inputs to the record information related to whether the change is an IT related change, the tracking number, WRM number, contact person and the type of IT request. A request attachments section 1180 depicts a section to include attachments in the record and identification of the amount of IT effort that is required in support of the initiative regarding the record. Project information 1190 is included and as depicted provides a projected target date for completion, milestones, and responsible party for the effort.

Figure 10:
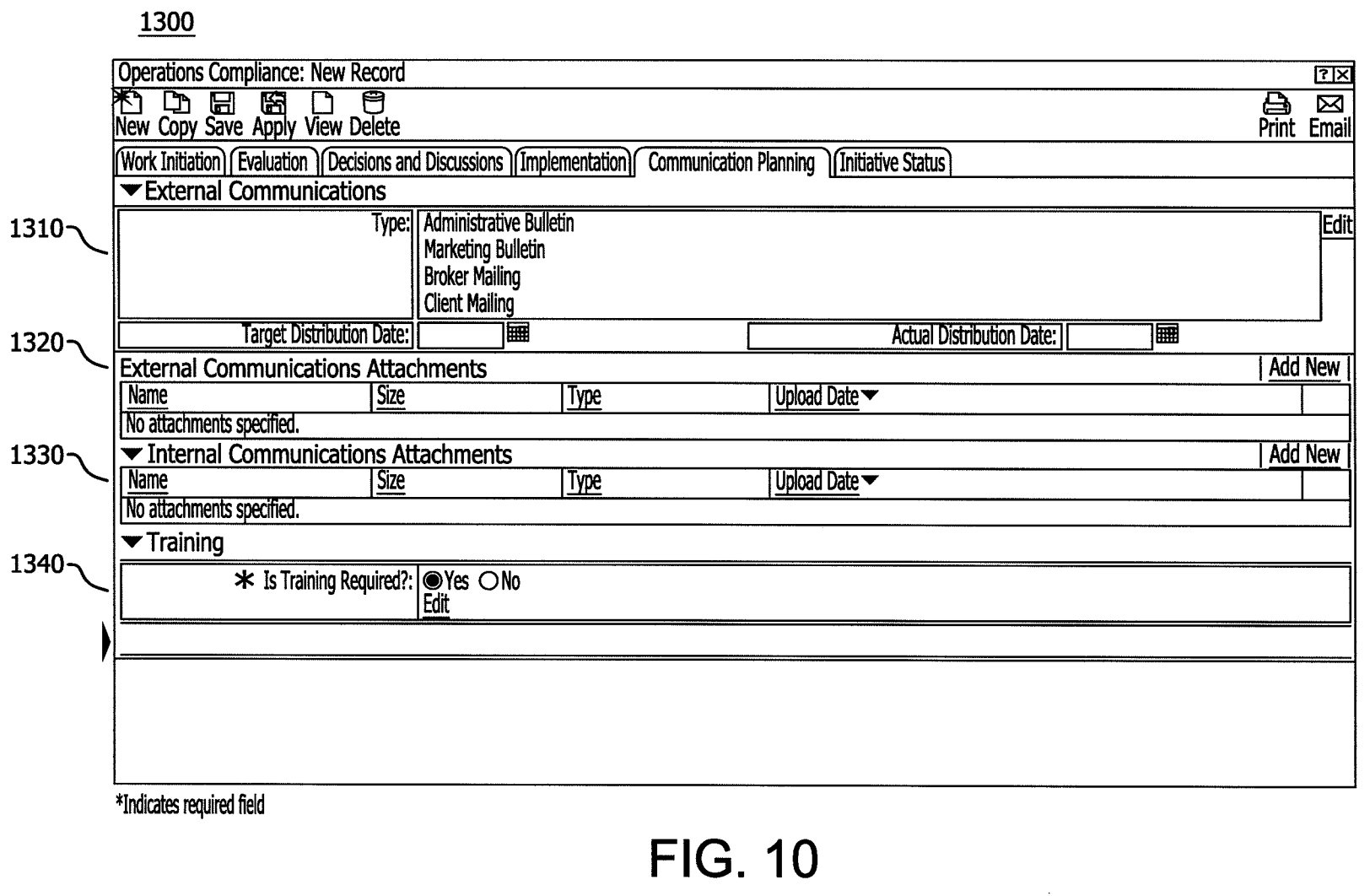

FIG. 10 illustrates a screen shot 1300 of the system 100 that may be used in the communicating of step 255. Specifically, screen shot 1300 depicts an area for entering information in the record for external communications 1310, external communications attachments 1320, internal communications attachments 1330, and training 1340. External communications 1310 includes the type of external communication that is to be provided, such as administrative bulletin, marketing bulletin, broker mailing, and client mailing, for example, and may include the target and actual distribution date for the external communication 1310. External communication attachments section 1320 may provide a section to attach and identify the external communication attachments associated with the record. Internal communication attachments 1330 may also be included with the associated record. The record may also be designated as requiring training 1340 as necessary.

Figure 11:
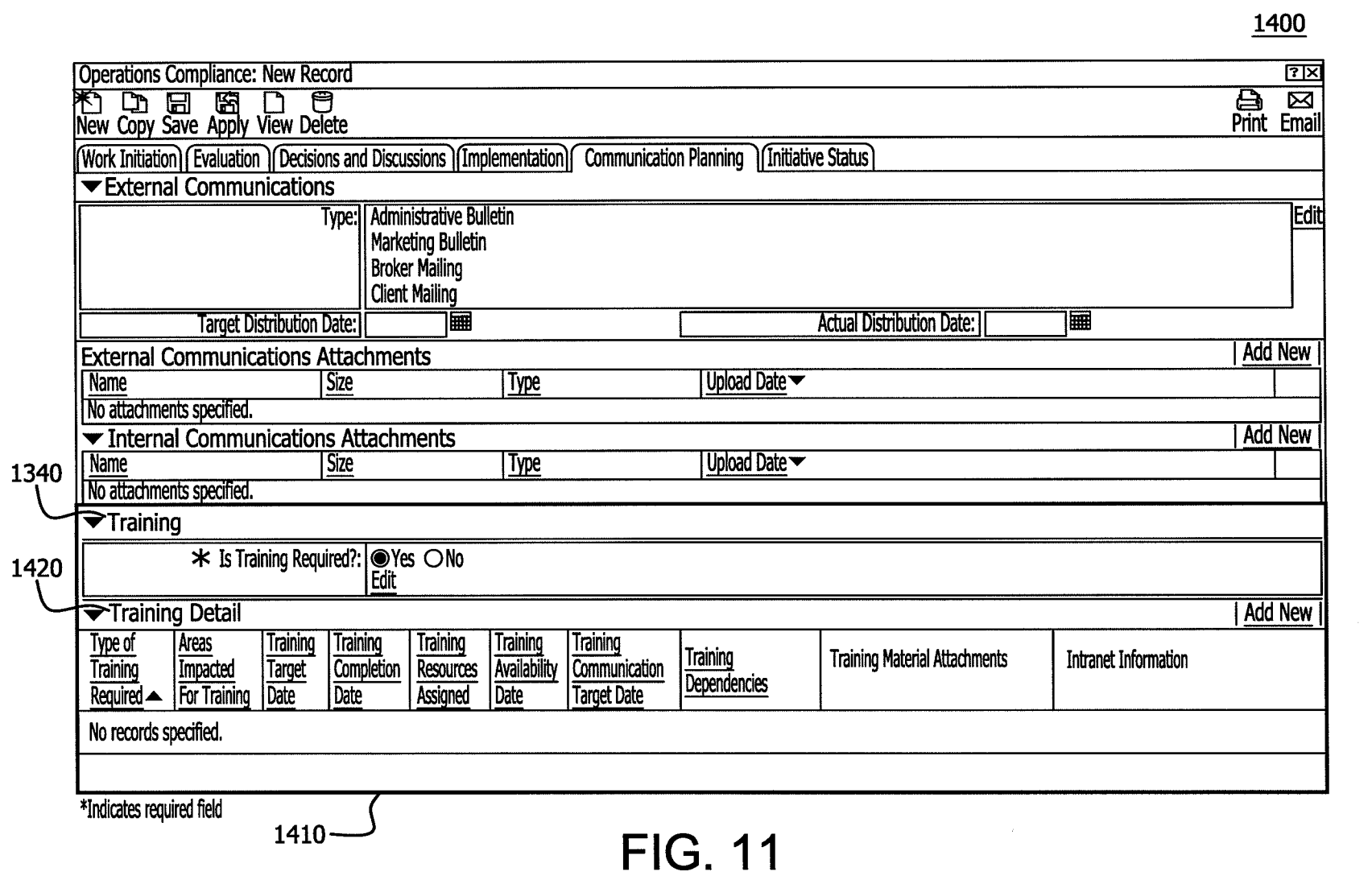

FIG. 11 illustrates a screen shot 1400 demonstrating the actions of system 100 when the required training 1340 of screen shot 1300 is toggled to "yes." As is depicted in screen shot 1400 a new sub-window 1410 appears when training is toggled to "yes" for required training 1340. This sub-window is a special grouping of fields that can be embedded and used to collect information within individual records. When a user adds or edits a record in a record that contains a sub-window, the sub-window may be filled out multiple times to input all necessary information, such as for multiple trainings, for example. Training details 1420 may appear in sub-window 1410 depicting the type of training required, area impacted for training, training target and completion dates, resources assigned, training materials attachments and intranet information, for example.

FIG. 12 illustrates a screen shot 1500 depicting the training detail sub-window 1410 allowing input of new information. As depicted in screen shot 1500, the type of training required 1510, training target date 1520, training resources assigned 1530, training availability date 1540, training dependencies 1550, areas impacted for training 1560, training completion date 1570, training communication target date 1580, and training material attachments 1590 may be entered into the record as appropriate.

Figure 13:
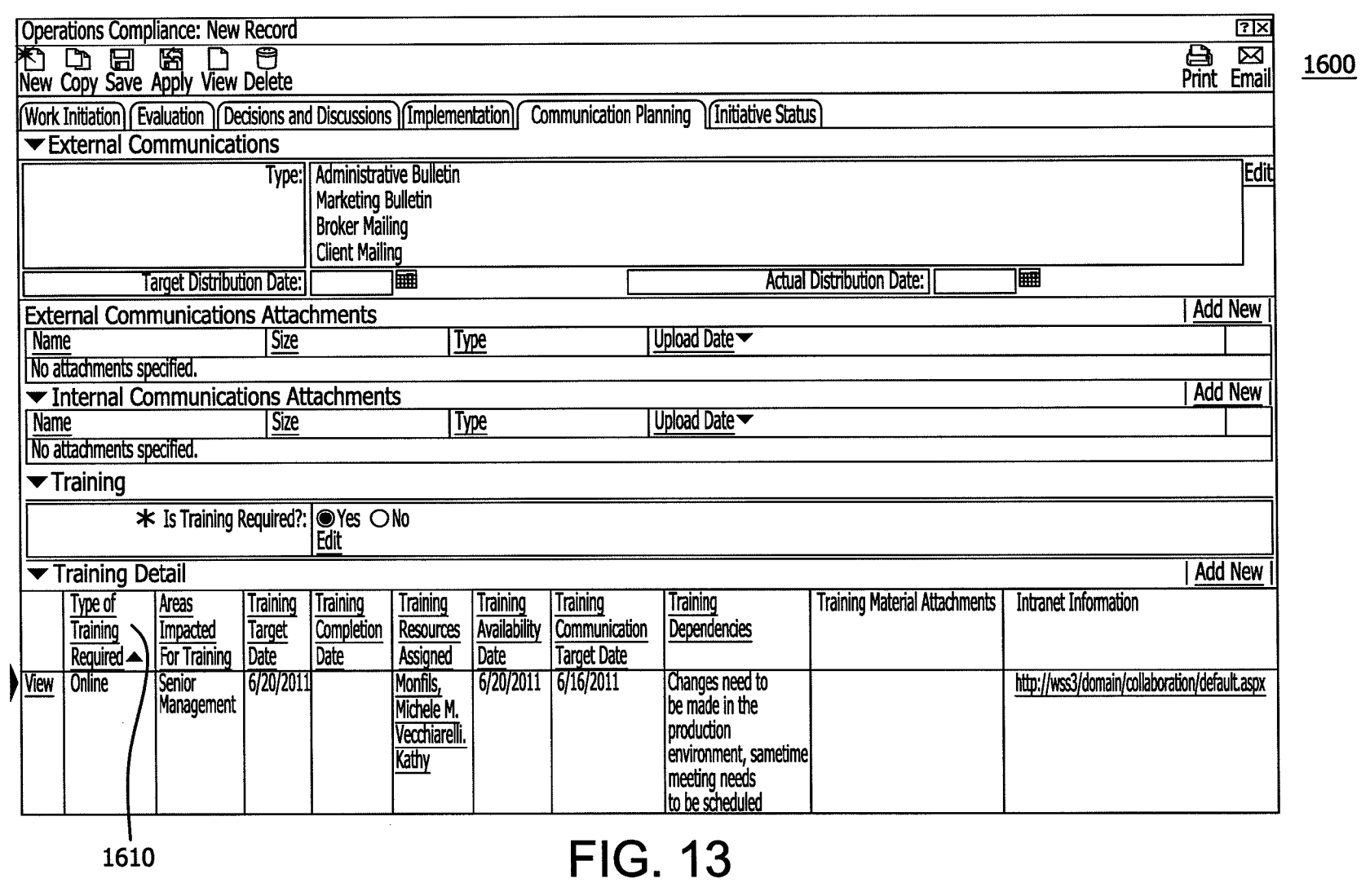

FIG. 13 illustrates a screen shot 1600 depicting a completed sub-window of screen shot 1500. The information entered in each category if screen shot 1500 registers as a training detail 1610 and allows for editing and updating information contained within the sub-window.

Figure 15:
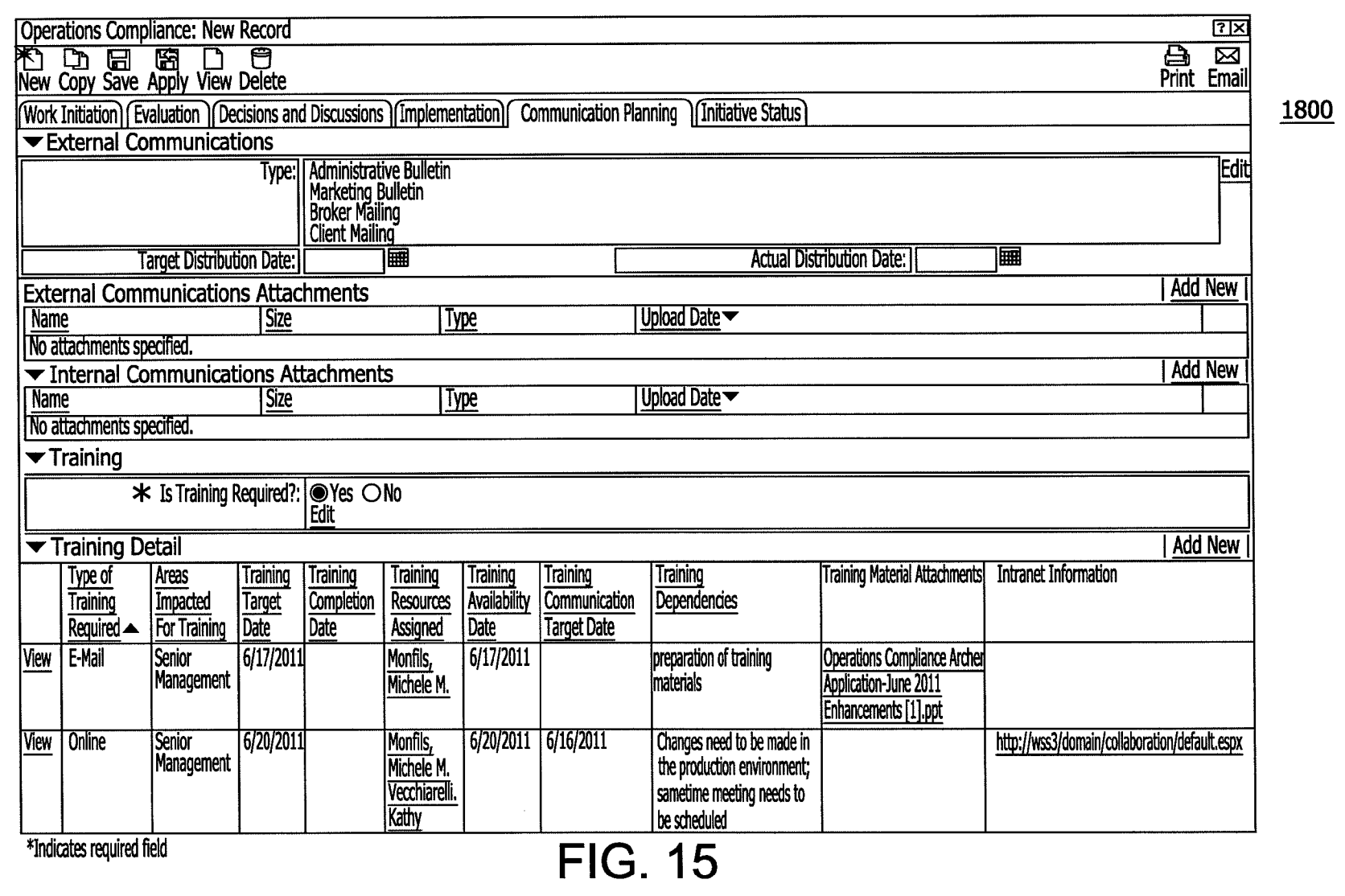

FIG. 14 illustrates a screen shot 1700 depicting a completed email training sub-window. FIG. 15 illustrates a screen shot 1800 depicting multiple completed training sub-windows.

Figure 16:
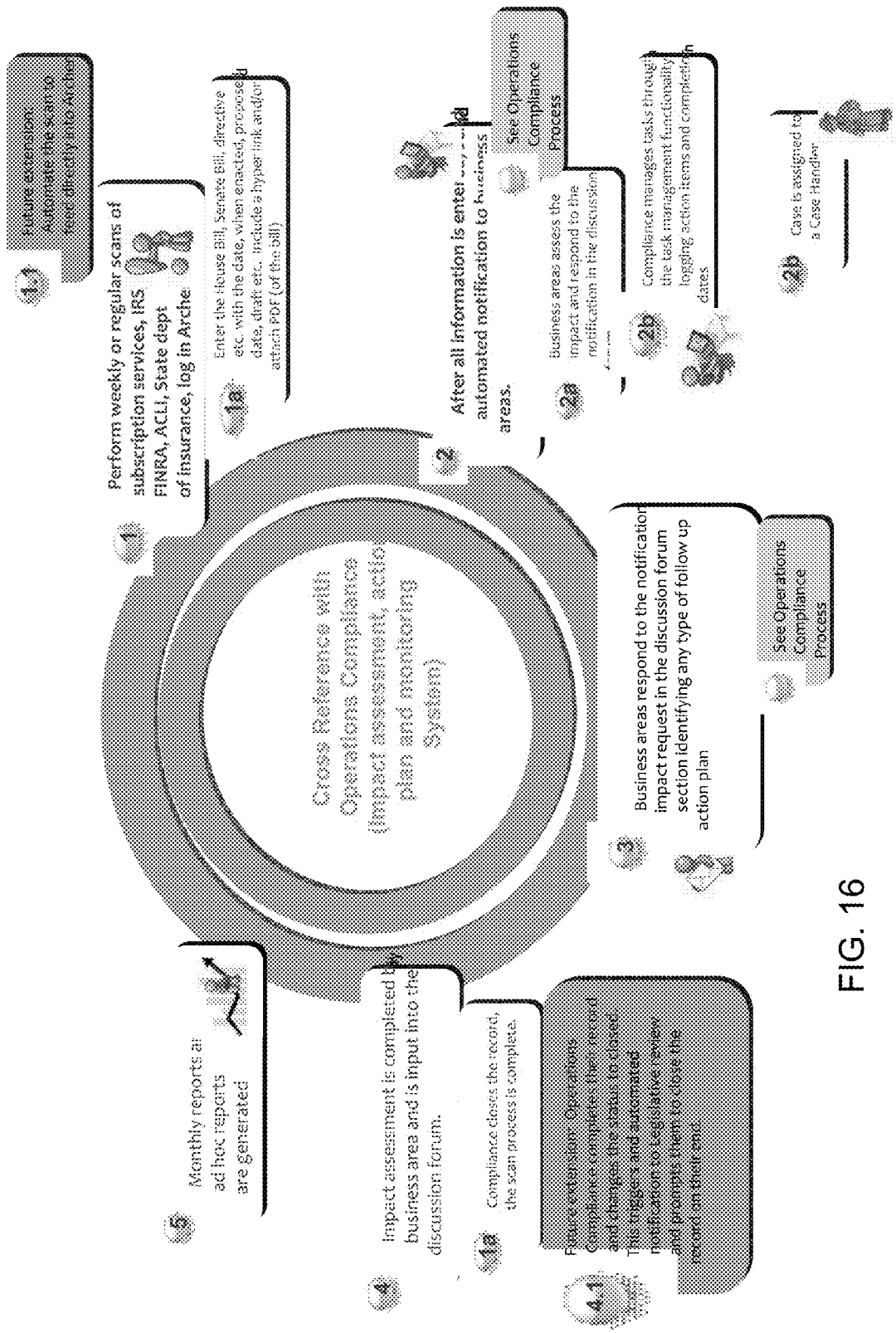
FIG. 16 illustrates a flow with respect to an exemplary wealth management scanning.

In order to provide a flow of the present system, a specific example of wealth management legislation review process 1900 may be used. FIG. 16 illustrates a flow of system 100 with respect to wealth management scanning. Specifically, FIG. 16 illustrates the five high-level steps as discussed in FIG. 2. In the specific example of wealth management 1900, initiation 215 may include performing weekly or regular scans of subscription services, Internal Revenue Service (IRS), Financial Industry Regulatory Authority (FINRA), American Council of Life Insurers (ACLI), and various states Department of Insurance at step 1. Step 1 may be performed automatically (step 1.1) in that system 100 may scan and feed directly into system 100 and/or the scan may be performed outside of system 100 and the results of the scan may be entered at step 1a. In step 1a, the House Bill, Senate Bill, directive, or other legal authority may be entered into system 100 along with relevant dates such as the date of enactment, the date the legal authority takes effect, and the like. A hyperlink may also be included to attach a copy of the legal authority, such as in PDF form, for example.

After initiation, the evaluation 225 of process 1900 may include notification to the various effected business areas at step 2. The various business areas may assess the impact and respond to the notification in the discussion forum at step 2a. A step 2b, compliance manages tasks through the task management functionality logging action items and completion dates. This management of task may include assigning the case to a case handler, for example.

After evaluation, the implementation 245 of process 1900 may include business areas responding to the notification impact in the discussion forum section identifying the type of follow-up action plan at step 3. After implementation, the communication 255 of process 1900 may include inputting the completed impact assessment into the discussion forum at step 4. Compliance may then close the record as the scan is complete at step 4a. At step 4.1, the closing of the record triggers an automated notification to the legislative review and prompts the legislative review to close the record.

The monitoring 265 of process 1900 may be initiated after completion of the communication. This monitoring may include monthly reports and ad hoc reports being generated to monitor and track the compliance with the legal authority at step 5.

Figure 17:
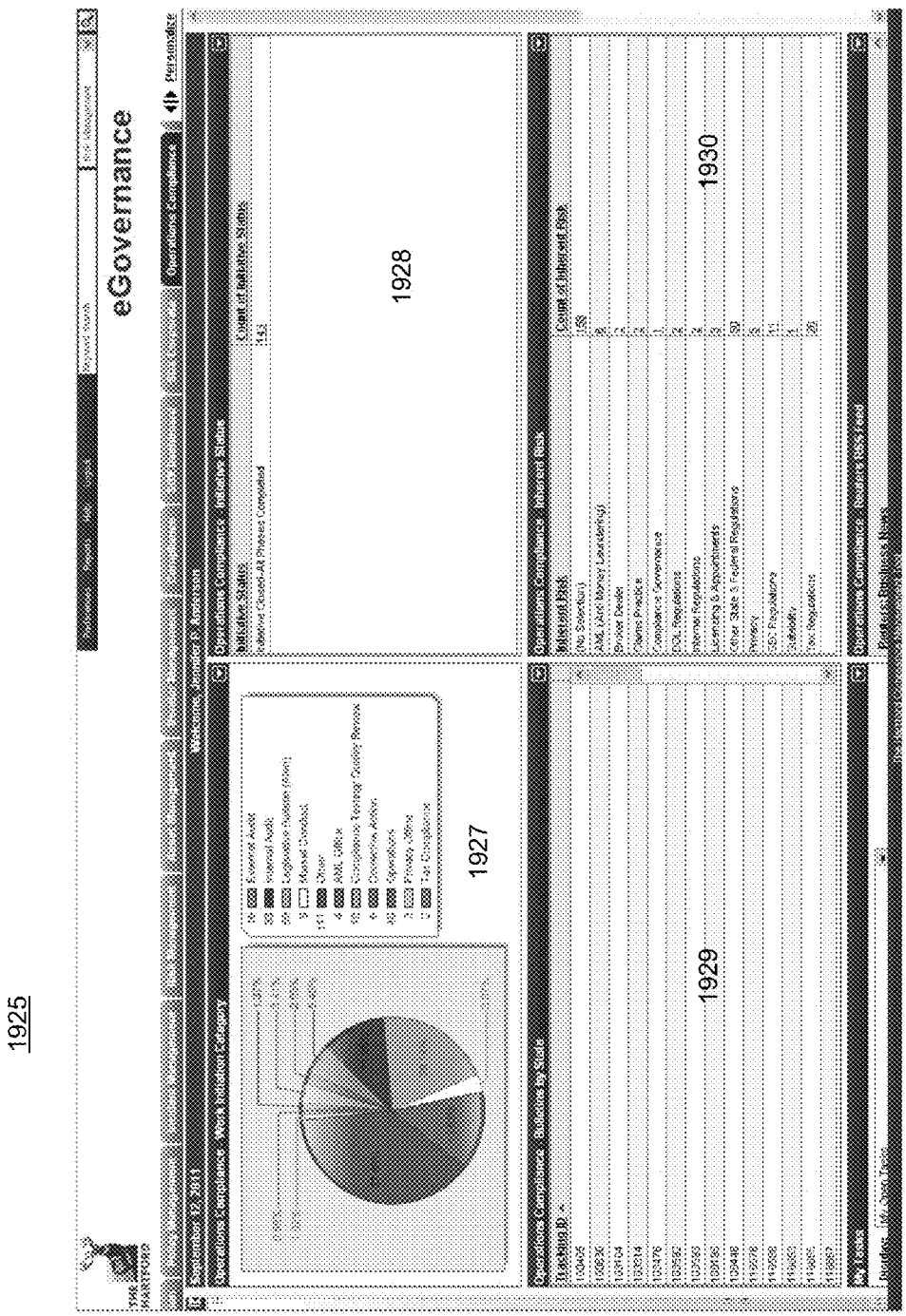
FIG. 17 illustrates an operation compliance dashboard in the exemplary wealth management system.
Figure 18:
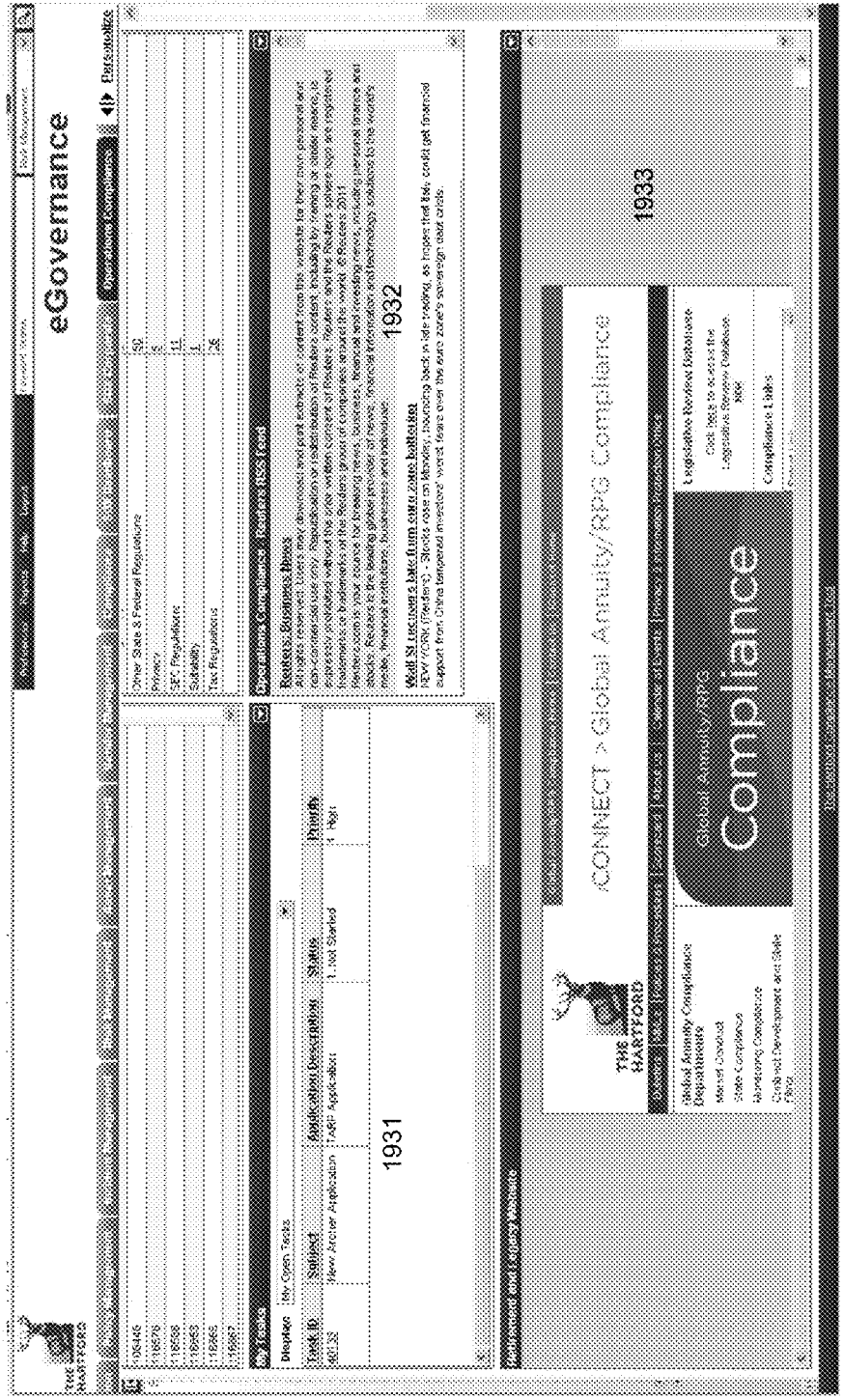
FIG. 18 illustrates the second portion of the operation compliance dashboard.

FIG. 17 illustrates an operation compliance dashboard 1925 of system 100. FIG. 18 illustrates the second portion of the operation compliance dashboard 1926. Dashboard 1925 includes a highlights work by initiation category 1927. This shows the work and the origins of the work, such as the type of legal authority including external audit, legislative bulletin, tax compliance, for example. Dashboard 1925 includes a list of initiative status 1928. As shown in the example of FIG. 17, all initiatives are closed and all phases are completed.

Dashboard 1925 may include a listing of bulletins 1929 by state including the tracking identification. Dashboard may include the inherent risk lists listing the risks categories and a count of the initiatives against each of the categories 1930. As shown in the example of FIG. 17, compliance governance has one count of inherent risk while tax regulations have 26 counts, for example. Illustrated in FIG. 18 are the task lists by user 1931, the Reuters RSS feed 1932 and the iConnect website 1933 for compliance in Global Annuities.

Figure 19:
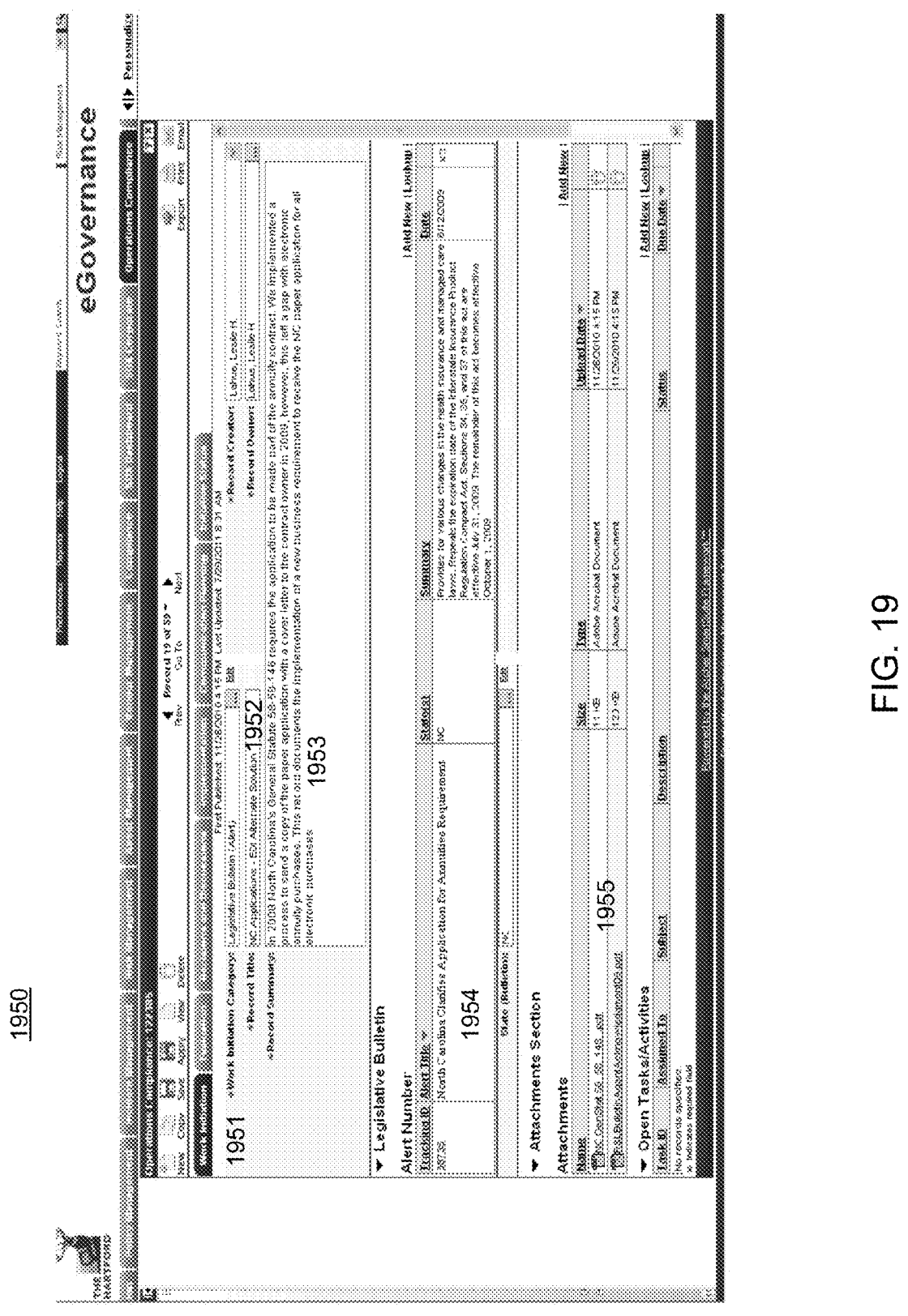

FIG. 19 illustrates a work initiation tab 1950 with respect to a legislative bulletin and specifically the North Carolina EDI Alternate Solution 1952. A summary 1953 of the Bulletin is provided. Screen 1950 provides an alert number and tracking identification 1954 for the North Carolina Clarification for the Annuities Requirement with the date of Aug. 12, 2009. Attachments 1955 are included including the statute at issue and the bulletin associated with the status.

Figure 20:
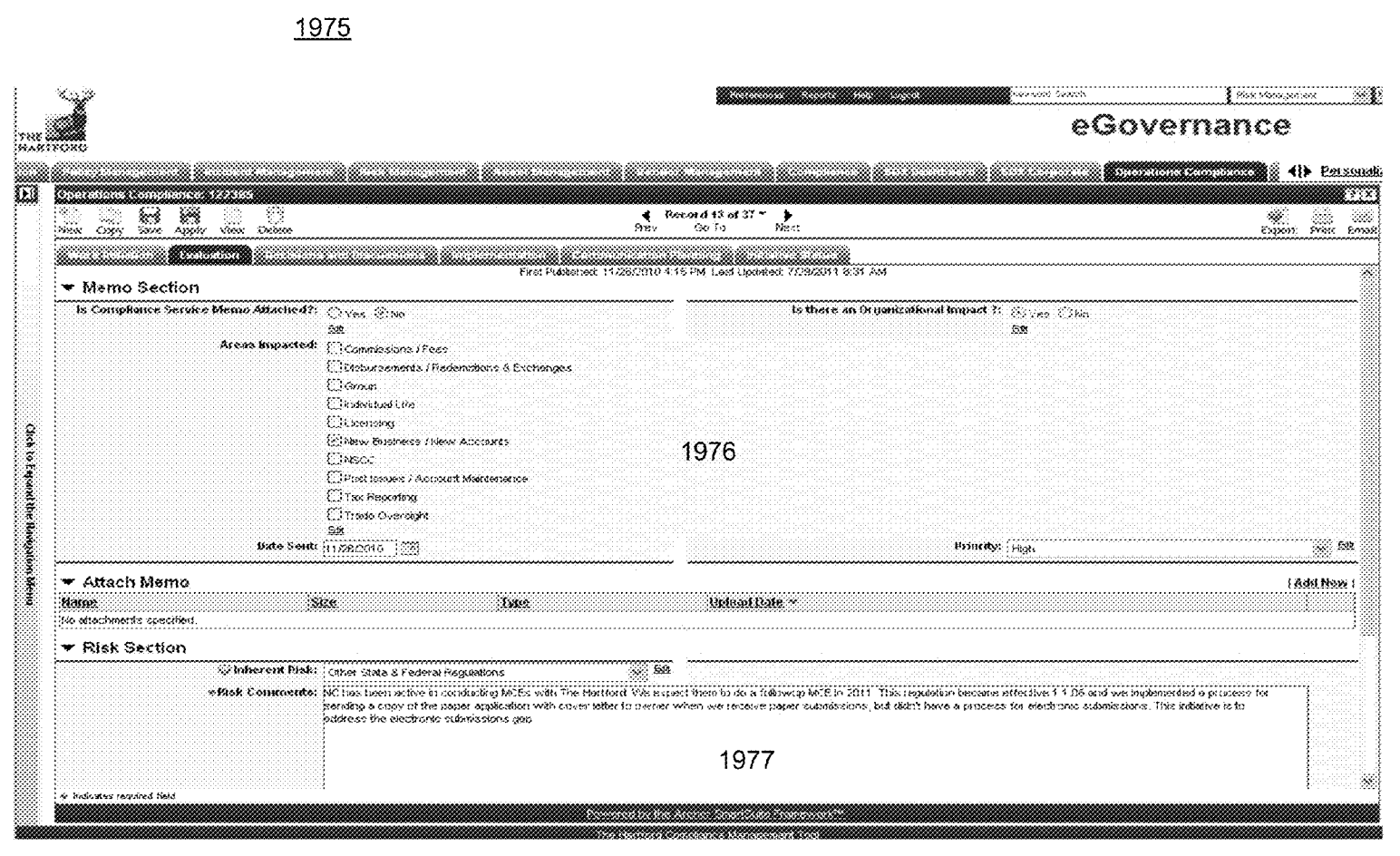

FIG. 20 illustrates an evaluation tab 1975 that enables additional detail in evaluating the scope, understanding the associated inherent risk and identifying monitoring requirements. Specifically, the screen shot 1975 provides information and a record to maintain the compliance service memorandum 1976 and a documented organizational impact. Further, screen shot 1975 provides a risk section 1977 that includes comments about North Carolina being active in conducting MCEs with the Hartford, in this example.

Figure 21:
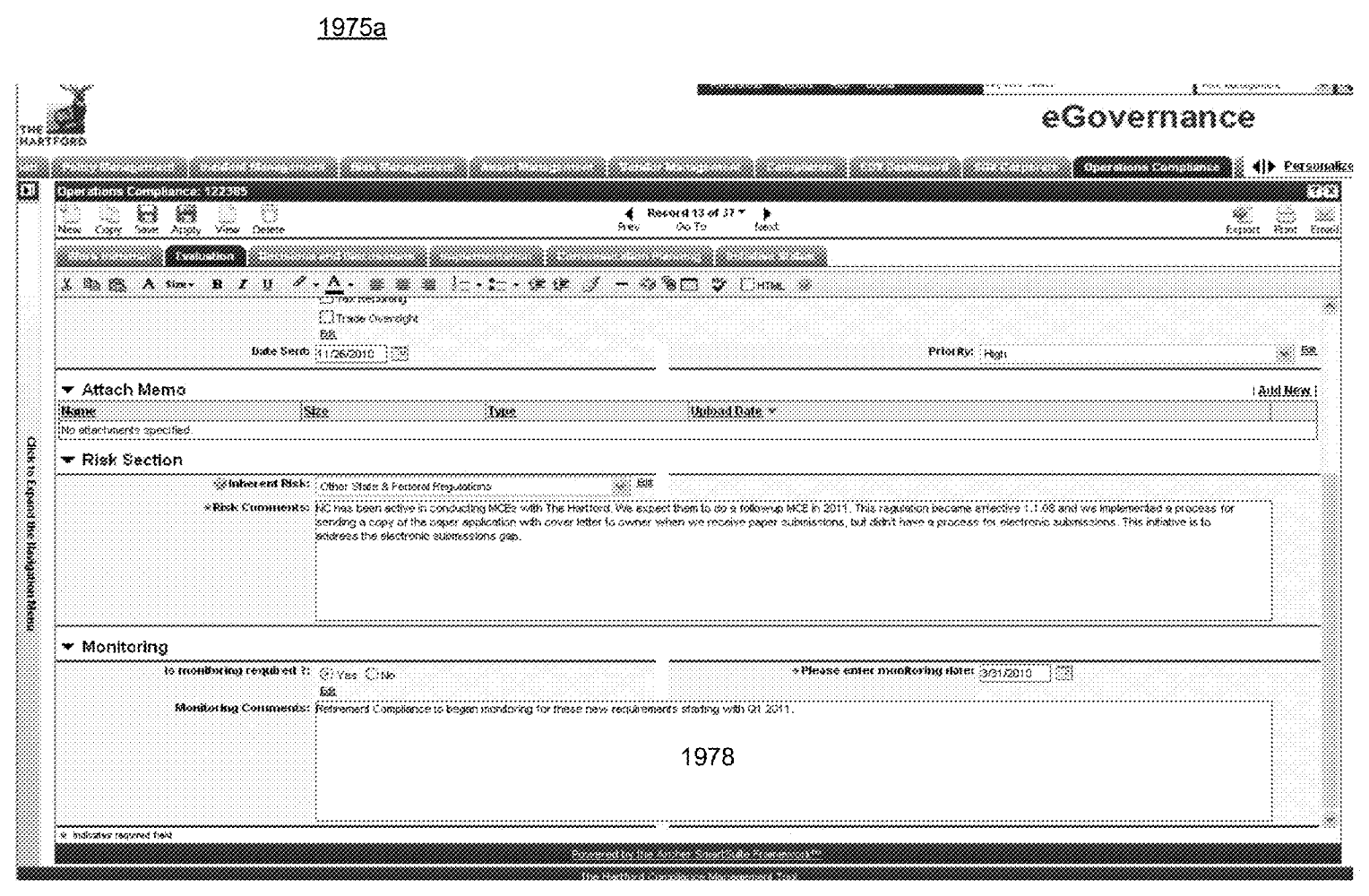

FIG. 21 illustrates, in conjunction with FIG. 20, a portion of the evaluation tab 1975a. As may be seen in FIG. 21, a monitoring input 1978 is included in system 100. This monitoring input allows designation for monitoring including dates on which monitoring may occur. Further, monitoring comments may be included. These comments may include retirement compliance to begin monitoring for these new requirements upon a certain timeframe.

Figure 22:
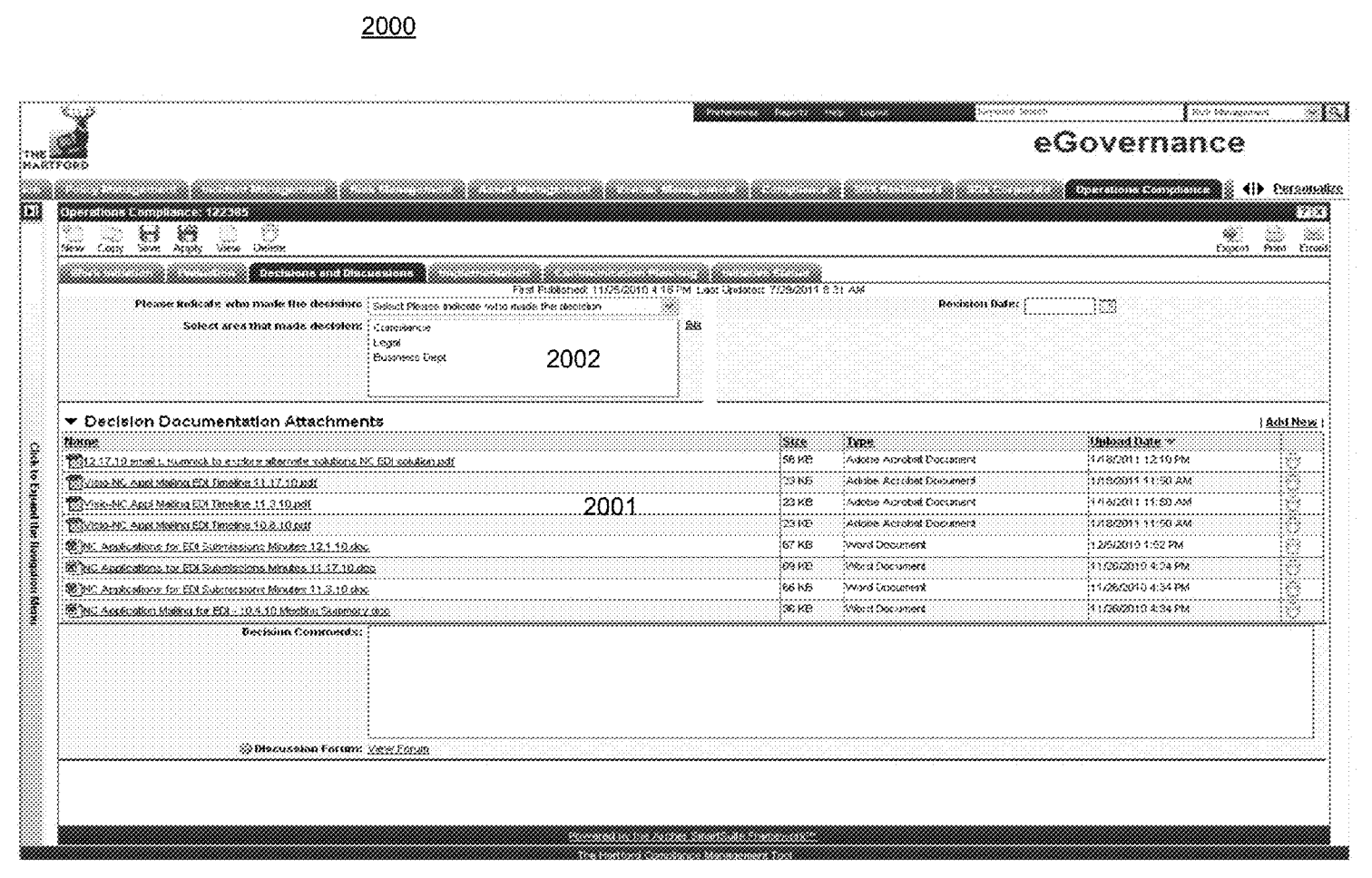

FIG. 22 illustrates a screen shot of a tab for decisions and discussions 2000. This tab captures relevant decisions specific to the compliance initiative. Any discussions that may impact the compliance initiative may also be captured in the discussion forum. The discussions are included directly on the record of system 100. These decision documentation attachments 2001 may be included for review, as well as, indicating the area that made the decision 2002 within the record.

Figure 23:
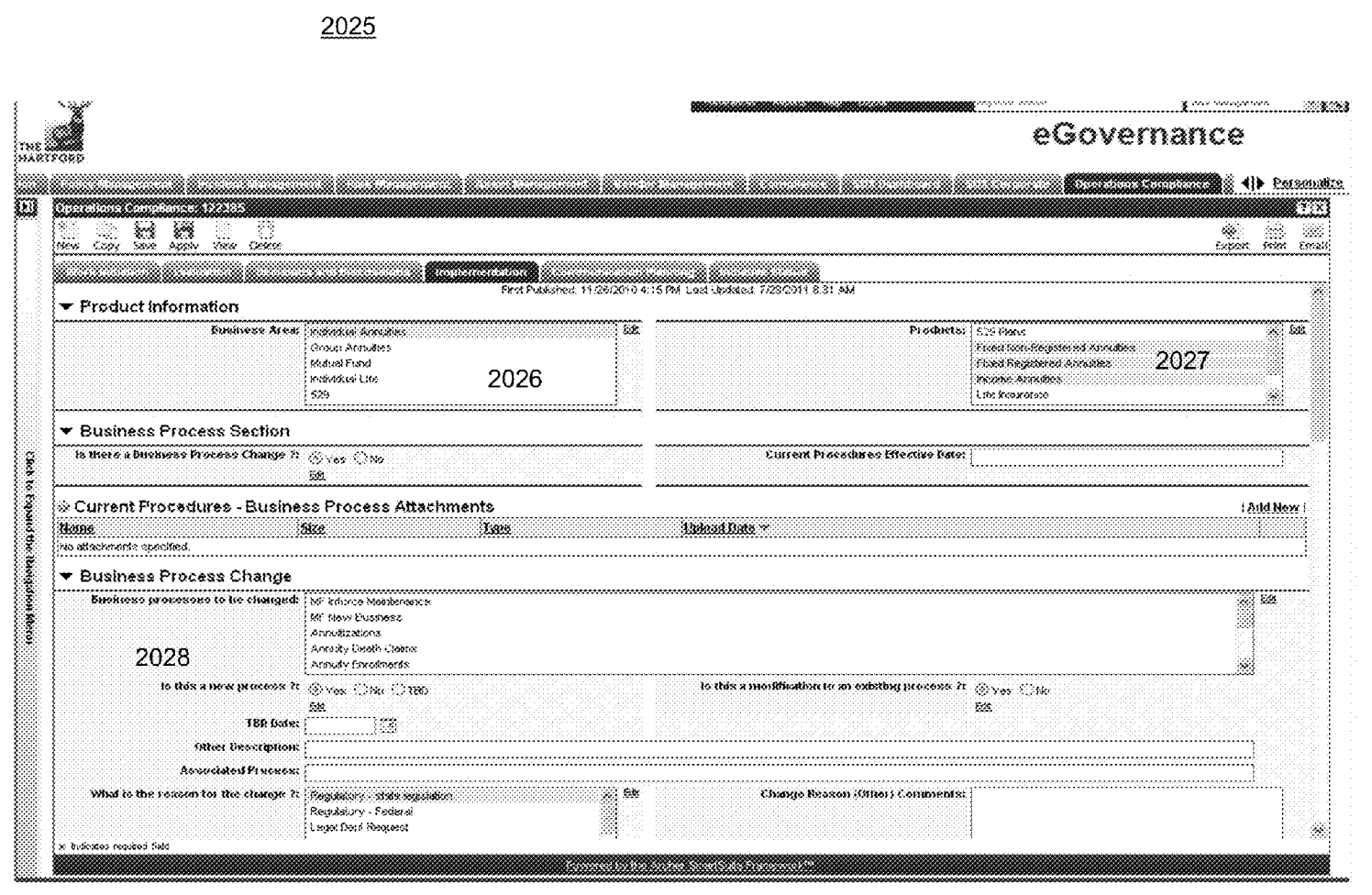

FIG. 23 illustrates a screen shot of the implementation tab 2025. This tab includes effected product information by business area 2026 and by product 2027. Further, this tab documents the business process modifications 2028 including process to be changed, records of older versions of the process, and identifies the reason for the change.

Figure 24:
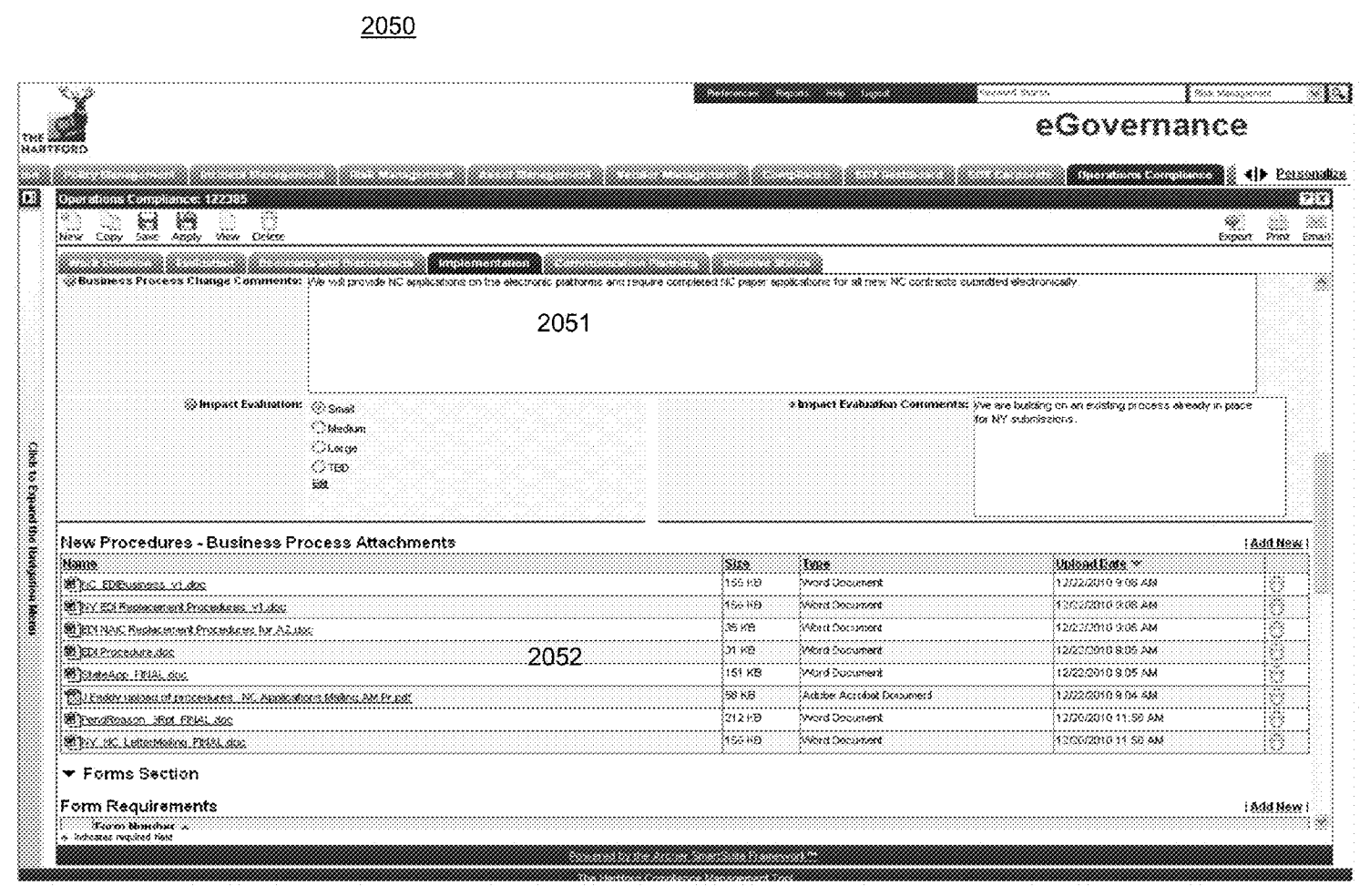

FIG. 24 illustrates another screen shot 2050 with respect to the implementation tab. Shot 2050 illustrates input of the business process change comments 2051. In this example, the comments include North Carolina applications on the electronic platforms and require completed North Carolina paper applications for all electronic North Carolina contracts. New procedures and business process attachments 2052 may also be included for review, monitoring and tracking purposes.

Figure 25:
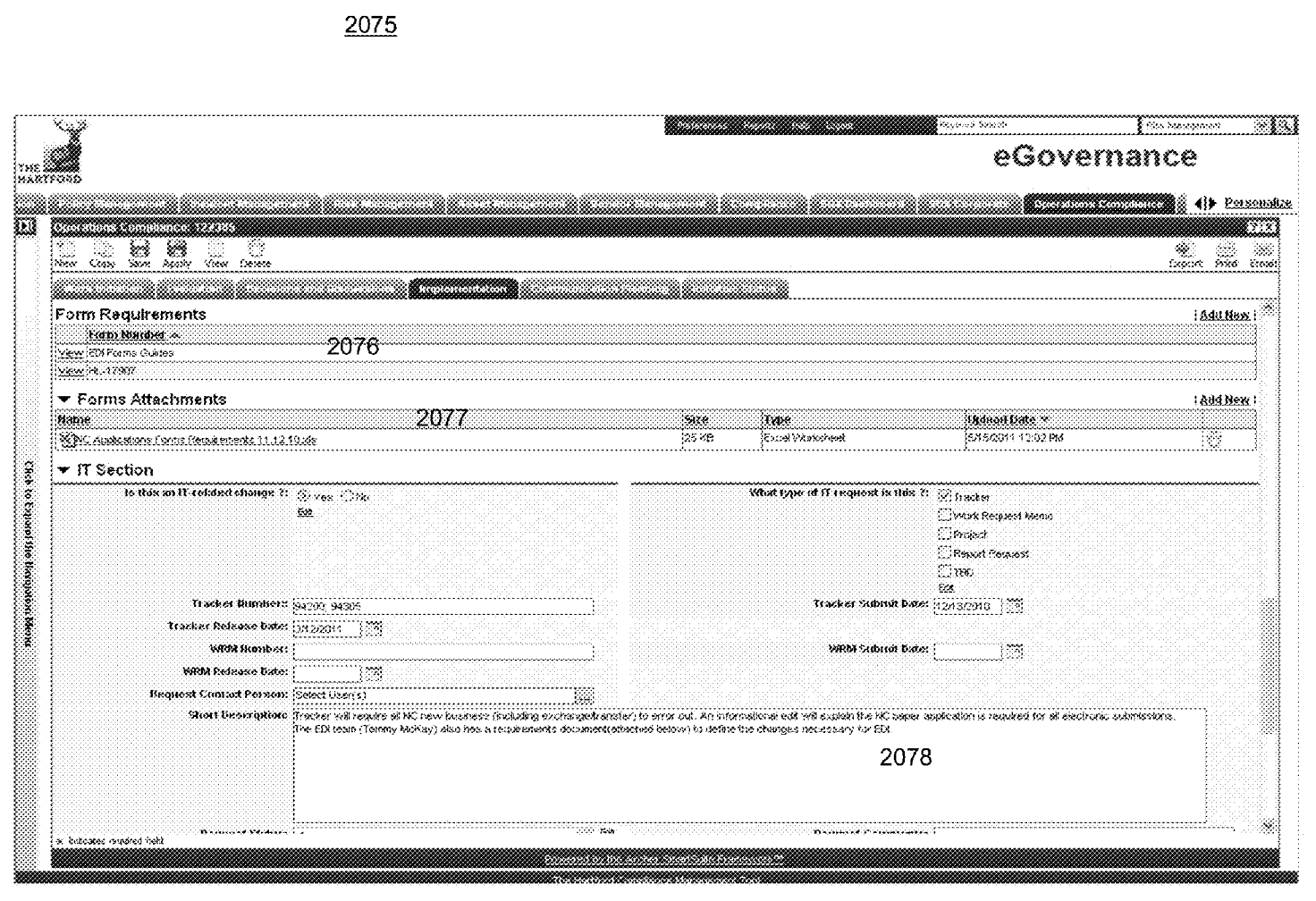

FIG. 25 illustrates a screen shot 2075 that captures form changes in the implementation stage. This shot 2075 may include legacy forms, form requirements 2076, and attachments 2077. Specific requests and contact to monitor 2078 may be maintained and may be identified as a dependency to fulfill the compliance initiative.

Figure 26:
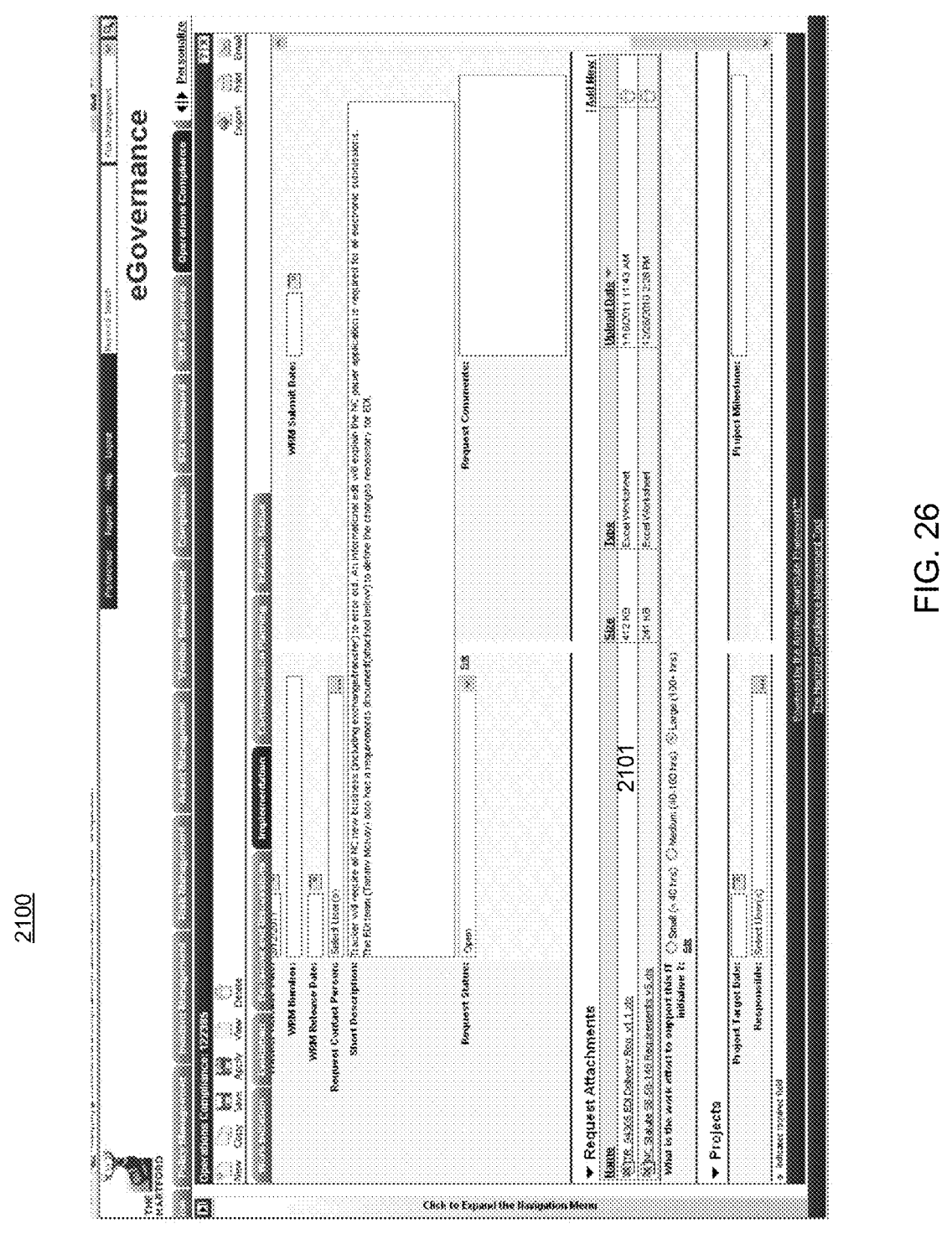

FIG. 26 illustrates a screen shot 2100 of the implementation tab with respect to the North Carolina example. Attachments 2101 may be included in the record and an estimation of the time to implement the compliance initiative is provided.

Figure 27:
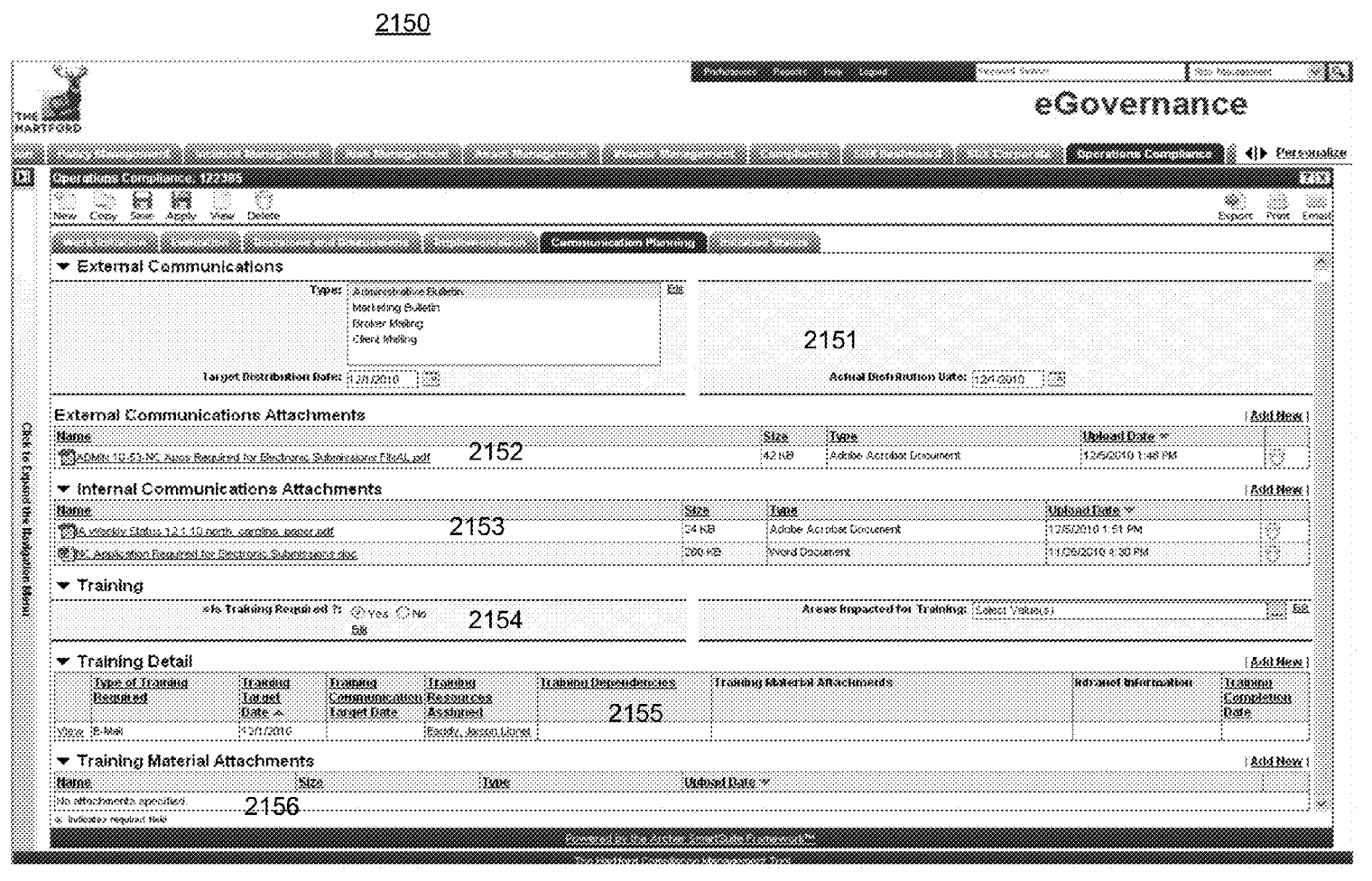

FIG. 27 illustrates a screen shot 2150 of the communications planning of this specific example of system 100. Screen 2150 provides information regarding the external communications 2151 and allows for attaching or interacting with previously attached attachments, including external attachments 2152 and internal attachments 2153. Screen 2150 identifies whether training is required 2154 and, if required, the details of the training 2155. Materials for the training 2156 may also be included.

Figure 28:
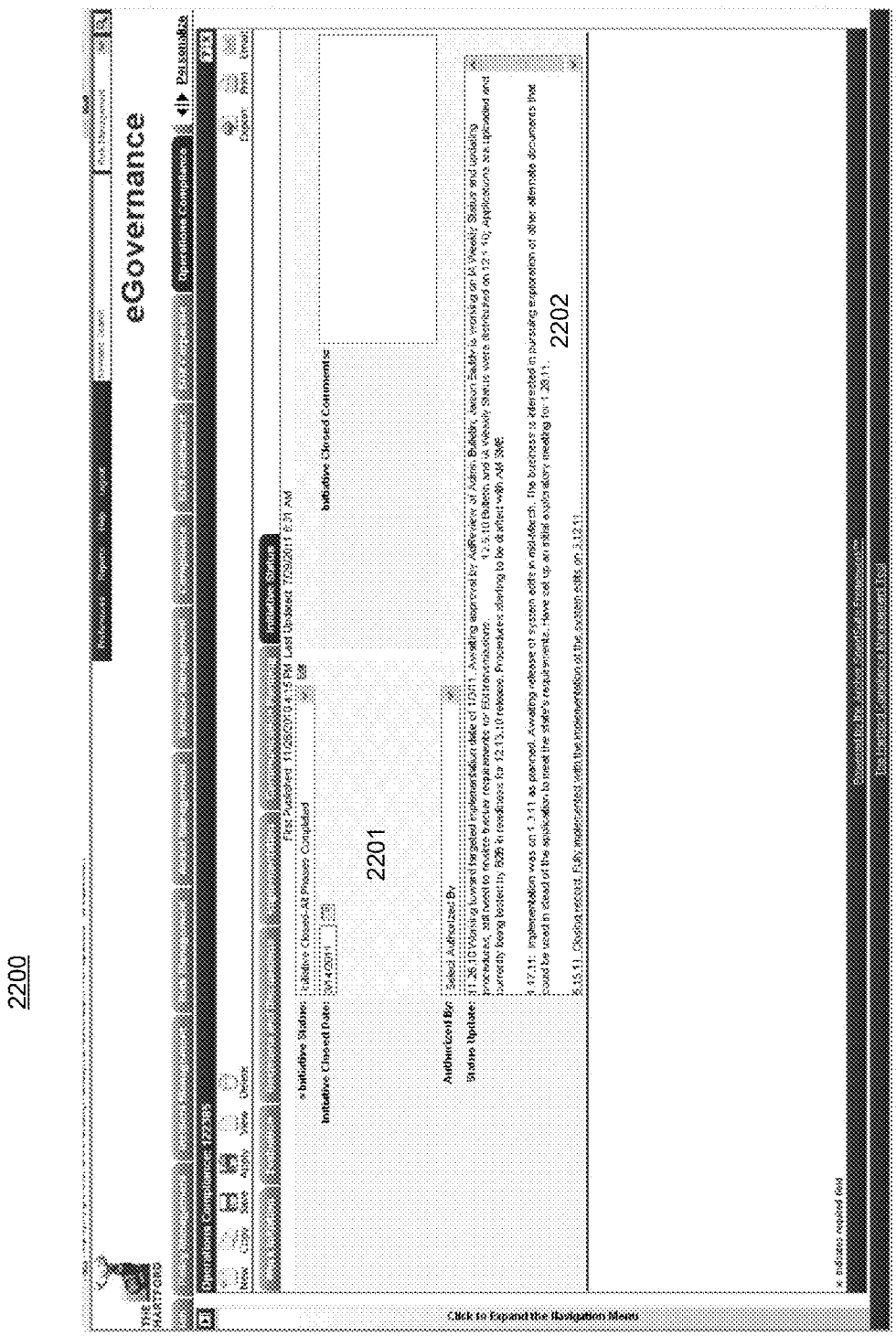
FIG. 28 illustrates a screen shot related to the specific example providing a compliance initiative status.

FIG. 28 illustrates a screen shot 2200 related to the specific example providing a compliance initiative status. Shot 2200 includes a status and date of status 2101 and provides a status update 2202 within the record.

Figure 29:
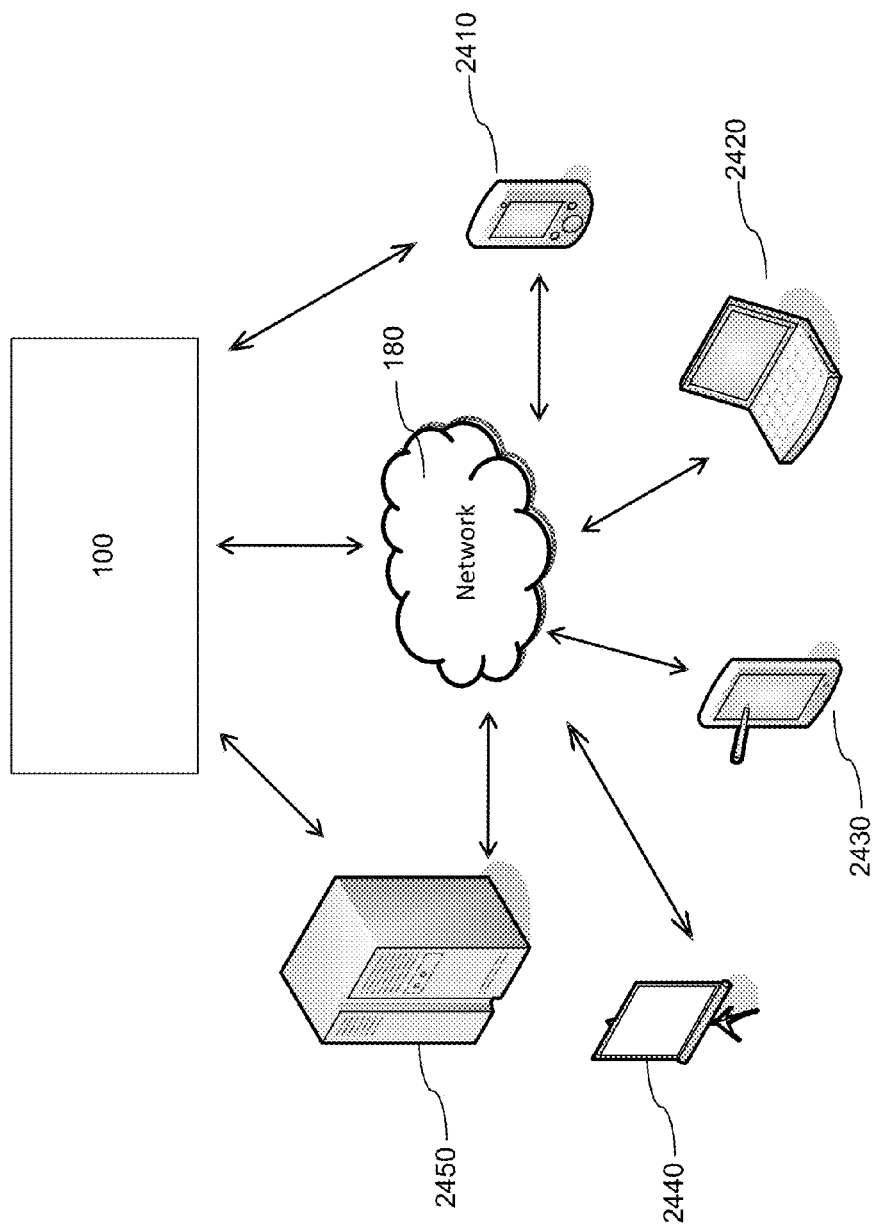
FIG. 29 illustrates access to system using a myriad of different interfaces.

FIG. 29 illustrates access to system 100 using a myriad of different interfaces. These interfaces include a mobile device 2410, a personal computer 2420, a pad computer 2430, a thin client 2440, and/or a mainframe 2450. Each of these interface may access system 100 directly, such as via bus 130, or through network 180.

Figure 30:
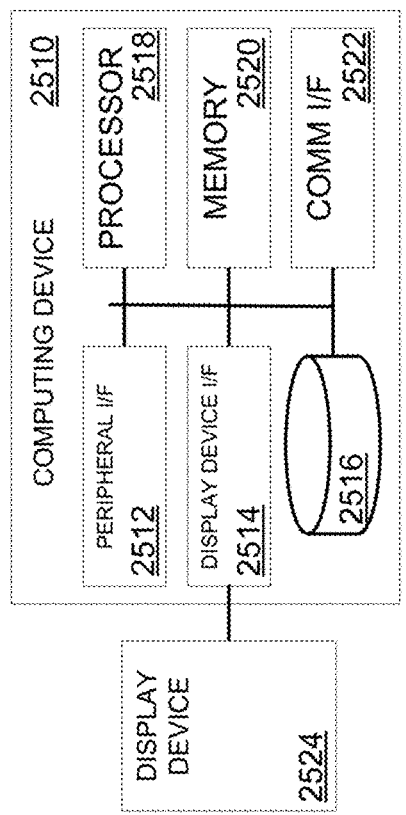
FIG. 30 illustrates an example computing device that may be used to implement the features of FIGS. 1-29.

FIG. 30 shows an example computing device 2510 that may be used to implement features describe above with reference to FIGS. 1-29. The computing device 2510 includes a processor 2518, memory device 2520, communication interface 2522, peripheral device interface 2512, display device interface 2514, and data storage device 2516. FIG. 30 also shows a display device 2524, which may be coupled to or included within the computing device 2510.

The memory device 2520 may be or include a device such as a Dynamic Random Access Memory (D-RAM), Static RAM (S-RAM), or other RAM or a flash memory. The data storage device 2516 may be or include a hard disk, a magneto-optical medium, an optical medium such as a CD-ROM, a digital versatile disk (DVDs), or Blu-Ray disc (BD), or other type of device for electronic data storage.

The communication interface 2522 may be, for example, a communications port, a wired transceiver, a wireless transceiver, and/or a network card. The communication interface 2522 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 2512 is configured to communicate with one or more peripheral devices. The peripheral device interface 2512 operates using a technology such as Universal Serial Bus (USB), PS/2, Bluetooth, infrared, serial port, parallel port, and/or other appropriate technology. The peripheral device interface 2512 may, for example, receive input data from an input device such as a keyboard, a mouse, a trackball, a touch screen, a touch pad, a stylus pad, and/or other device. Alternatively or additionally, the peripheral device interface 2512 may communicate output data to a printer that is attached to the computing device 2510 via the peripheral device interface 2512.

The display device interface 2514 may be an interface configured to communicate data to display device 2524. The display device 2524 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 2514 may operate using technology such as Video Graphics Array (VGA), Super VGA (S-VGA), Digital Visual Interface (DVI), High-Definition Multimedia Interface (HDMI), or other appropriate technology. The display device interface 2514 may communicate display data from the processor 2518 to the display device 2524 for display by the display device 2524. As shown in FIG. 30, the display device 2524 may be external to the computing device 2510, and coupled to the computing device 2510 via the display device interface 2514. Alternatively, the display device 2524 may be included in the computing device 2510.

An instance of the computing device 2510 of FIG. 30 may be configured to perform any feature or any combination of features described above as performed by the system 100. Alternatively or additionally, the memory device 2520 and/or the data storage device 2516 may store instructions which, when executed by the processor 2518, cause the processor 2518 to perform any feature or any combination of features described above as performed by system 100. Alternatively or additionally, each or any of the features described above as performed by system 100 may be performed by the processor 2518 in conjunction with the memory device 2520, communication interface 2522, peripheral device interface 2512, display device interface 2514, and/or storage device 2516.

Figure 31:
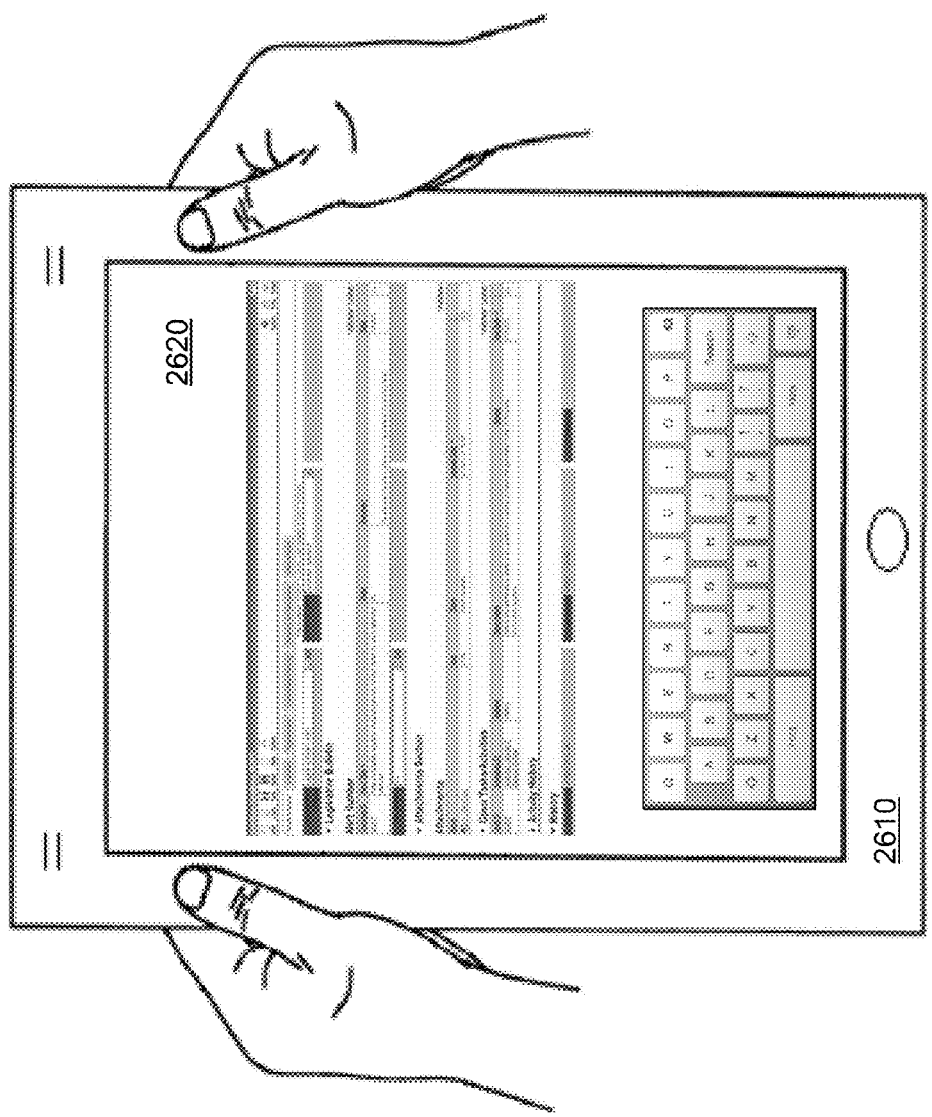
FIG. 31 illustrates a tablet computer that is a more specific example of the computing device of FIG. 30.

FIG. 31 shows a tablet computer 2610 that is a more specific example of the computing device 2510 of FIG. 30. The tablet computer 2610 may include a processor (not depicted), memory device (not depicted), communication interface (not depicted), peripheral device interface (not depicted), display device interface (not depicted), storage device (not depicted), and touch screen display 2620, which may possess characteristics of the processor 2518, memory device 2520, communication interface 2522, peripheral device interface 2512, display device interface 2514, storage device 2516, and display device 2524, respectively, as described above with reference to FIG. 30. The touch screen display 2620 may receive user input using technology such as, for example, resistive sensing technology, capacitive sensing technology, optical sensing technology, or any other appropriate touch-sensing technology.

Although examples are provided above that relate to an insurance company and a service provider that provides services to the insurance company, the features described above with reference to FIGS. 1-31 are also applicable and/or may be used by, mutatis mutandis, any type of business, any type of non-business organization, and/or any individual.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to FIG. 1, the methods and features described above may be performed, mutatis mutandis, using any appropriate architecture and/or computing environment. Although features and elements are described above in particular combinations, each feature or element can be used alone or in any combination with or without the other features and elements. For example, each feature or element as described above with reference to FIGS. 1-31 may be used alone without the other features and elements or in various combinations with or without other features and elements. Sub-elements and/or sub-steps of the methods described above with reference to FIGS. 1-31 may be performed in any arbitrary order (including concurrently), in any combination or sub-combination.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention as set forth in the claims hereinafter.

What is claimed is:

1. A system for identifying at least one legal authority related to the insurance industry and tracking procedures responsive to the identified at least one legal authority while monitoring compliance with changed procedures, the system comprising:
    a processor configured to:
        identify at least one insurance related legal authority that relates to at least one insurance business area;
        determine the scope of the at least one insurance related legal authority; and
        assess the impact of the at least one insurance related legal authority to the related at least one insurance business area, wherein the assessed impact at least includes organizational impact and priority of procedure modification;
a memory device configured to store information in a central record that includes:
entries indicating information about the at least one insurance related legal authority and the assessed impact on the at least one insurance business area by the at least one insurance related legal authority; and
modified procedures of at least one insurance business area that comply with the at least one insurance related legal authority based on the scope of the at least one insurance related legal authority and assessed impact;
a display device configured to display communications regarding the modifications to the at least one insurance business area; and
a communications interface to record and communicate the modifications to the at least one insurance business area,
wherein the at least one insurance related legal authority includes one of an insurance related legislation, an insurance related regulation, a court holding, and a ruling for or against companies and a fine incident, and
wherein the modifications to the at least one business area are tracked and monitored for compliance with the changed procedures by comparing the modifications to procedures being performed by the at least one insurance business area.

2. The system of claim 1 wherein the modifications to the at least one business area include a modified procedure.

3. The system of claim 2 wherein the modified procedure includes a history of the procedure and the modifications based on the legal authority.

4. The system of claim 1 wherein the memory device is a database.

5. The system of claim 1 wherein the identifying creates baseline information within the central record.

6. The system of claim 1 wherein the evaluated impact on at least one insurance business area is assessed using gap analysis.

7. The system of claim 1 wherein the displayed communications include a legislative bulletin.

8. The system of claim 1 wherein the displayed communications include training.

9. The system of claim 1 wherein the modifications include an action plan.

10. The system of claim 1 wherein the modifications include a monitoring plan.

11. The system of claim 1 wherein tracking and monitoring identifies gaps in compliance.

12. The system of claim 11 wherein gaps in compliance are remediated.

13. The system of claim 1 wherein the legal authority comprises legislation.

14. The system of claim 1 wherein the legal authority comprises regulation.

15. The system of claim 1 wherein the legal authority comprises court decisions.

16. The system of claim 1 wherein the legal authority comprises United States jurisprudence.

17. The system of claim 1 wherein the legal authority is based abroad.

18. A method of complying with at least one legal authority related to the insurance industry and assuring compliance with the at least one insurance related legal authority, said method comprising:
initiating a central record in a database based on a processor identified at least one insurance related legal authority, the record associated with the at least one insurance related legal authority;
determining the scope of the at least one insurance related legal authority;
assessing the impact of the at least one insurance related legal authority to at least one business area, wherein the assessed impact at least includes organizational impact and priority of procedure modification;
storing the assessed impact in the record stored on a memory device;
implementing modifications to the procedures of the at least one insurance business area to comply with the at least one insurance related legal authority based on the scope of the at least one insurance related legal authority and assessed impact and storing the modifications on a memory device;
communicating the modifications to the at least one insurance business area using a communications interface; and
monitoring and tracking the modified procedures of the at least one insurance business area to comply with the at least one insurance related legal authority by comparing the modifications to procedures being performed by the at least one insurance business area,
wherein the insurance related legal authority includes at least one of legislation, regulation, court holdings and decisions, and rulings for or against companies and fine incidents.

19. The method of claim 18 wherein the initiating has a defined intake process for creating the central record based on the identified legal authority.

20. The method of claim 18 wherein the initiating creates baseline information within the central record about the legal authority.

21. The method of claim 18 wherein the evaluating determines the impact to the at least one business area by performing gap analysis.

22. The method of claim 18 wherein the implementing identifies and monitors key deliverables of the at least one business area.

23. The method of claim 18 wherein the implementing determines key reporting requirements incorporating data from at least one other business area.

24. The method of claim 18 wherein the communicating captures messages using a forum integral to the record, the forum accepting information input to the record.

25. The method of claim 18 wherein the communicating involves training within the at least one business unit.

26. The method of claim 18 wherein the communicating involves at least one legislative bulletin.

27. The method of claim 18 wherein the monitoring and tracking monitors and tracks the procedures of the at least one business unit.

28. A non-transitory computer readable medium including hardware design code stored thereon which when executed by a processor causes the system to comply with at least one legal authority related to the insurance industry and monitor and track compliance with the at least one insurance related legal authority, said method comprising:
initiating a central record in a database based on a processor identified at least one insurance related legal authority, the record associated with the at least one insurance related legal authority;
determining the scone of the at least one insurance related legal authority;

assessing the impact of the at least one insurance related legal authority to at least one business area, wherein the assessed impact at least includes organizational impact and priority of procedure modification;

storing the assessed impact in the record stored on a memory device;

implementing modifications to the procedures of the at least one insurance business area to comply with the at least one insurance related legal authority based on the scope of the at least one insurance related legal authority and assessed impact and storing the modifications on a memory device;

communicating the modifications to the at least one insurance business area using a communications interface; and monitoring and tracking the modified procedures of the at least one insurance business area to comply with the at least one insurance related legal authority by comparing the modifications to procedures being performed by the at least one insurance business area, wherein the legal authority includes at least one of legislation, regulation, court holdings and decisions, and rulings for or against companies and fine incidents.

29. The computer readable medium of claim 28 wherein the initiating creates baseline information within the central record based on the at least one legal authority.

30. The computer readable medium of claim 28 wherein the evaluating determines the impact to the at least one business area by performing gap analysis.

31. The computer readable medium of claim 28 wherein the implementing identifies and monitors key deliverables of the at least one business area.

32. The computer readable medium of claim 28 wherein the communicating captures messages using a forum integral to the record, the forum accepting information input to the record.

33. The computer readable medium of claim 28 wherein the communicating involves at least one legislative bulletin.

34. The computer readable medium of claim 28 wherein the monitoring and tracking monitors and tracks the procedures of the at least one business unit.

* * * * *